United States Patent
Felbinger et al.

(10) Patent No.: US 10,223,476 B1
(45) Date of Patent: Mar. 5, 2019

(54) RECOMMENDATION ENGINE FOR SIMULATED COLOCATION AT INTERCONNECTION FACILITIES

(71) Applicant: Equinix, Inc., Redwood City, CA (US)

(72) Inventors: Kirk A. Felbinger, San Jose, CA (US); Steve Ming Wu, Belmont, CA (US); Vijaay Doraiswamy, Fremont, CA (US)

(73) Assignee: EQUINIX, INC., Redwood City, CA (US)

( * ) Notice: Subject to any disclaimer, the term of this patent is extended or adjusted under 35 U.S.C. 154(b) by 377 days.

(21) Appl. No.: 15/072,817

(22) Filed: Mar. 17, 2016

Related U.S. Application Data

(60) Provisional application No. 62/197,356, filed on Jul. 27, 2015.

(51) Int. Cl.
*G06F 17/30* (2006.01)
(52) U.S. Cl.
CPC ...... *G06F 17/3097* (2013.01); *G06F 17/3053* (2013.01); *G06F 17/30241* (2013.01)
(58) Field of Classification Search
CPC ............. G06F 17/3053; G06F 17/3097; G06F 17/30241
USPC ....................................................... 707/732
See application file for complete search history.

(56) References Cited

U.S. PATENT DOCUMENTS

| 8,537,845 | B2 | 9/2013 | Waldrop et al. |
| 9,065,872 | B1 | 6/2015 | Duarte et al. |
| 9,576,048 | B2 * | 2/2017 | Akolkar ............ G06F 17/30707 |
| 2010/0125473 | A1 * | 5/2010 | Tung ..................... G06F 9/5072 709/200 |
| 2011/0137805 | A1 | 6/2011 | Brookbanks et al. |

(Continued)

FOREIGN PATENT DOCUMENTS

| EP | 2779590 A1 | 9/2014 |
| WO | 2012075448 A1 | 6/2012 |

OTHER PUBLICATIONS

Final Office Action from U.S. Appl. No. 15/055,990, dated Feb. 5, 2018, 13 pp.

(Continued)

*Primary Examiner* — Evan Aspinwall
(74) *Attorney, Agent, or Firm* — Shumaker & Sieffert, P.A.

(57) ABSTRACT

In some examples, a method includes obtaining, by a recommendation engine executing at a computing device, a list of prospective interconnection facilities administered by an interconnection facility provider and a list of prospective interconnection facility customers; identifying, by the recommendation engine, based at least in part on querying telemetry data that indicates interconnections of interconnection facility customers within the list of prospective interconnection facilities, sets of interconnection facilities from the list of prospective interconnection facilities in which respective interconnection facility customers are configured with existing interconnections; generating, by the recommendation engine and based at least in part on the list of prospective interconnection facilities, the sets of interconnection facilities, and the list of prospective interconnection facility customers, scoring data for the prospective interconnection facilities; and outputting, by the recommendation engine and for display to a user, the scoring data.

24 Claims, 11 Drawing Sheets

(56) References Cited

U.S. PATENT DOCUMENTS

2011/0270968 A1* 11/2011 Salsburg .............. G06F 9/5072
709/224
2012/0151057 A1   6/2012 Paredes et al.
2013/0282897 A1  10/2013 Siegel et al.

OTHER PUBLICATIONS

Amendment in Response to Office Action dated Feb. 5, 2018, from U.S. Appl. No. 15/055,990, filed Apr. 5, 2018, 19 pp.
Advisory Action from U.S. Appl. No. 15/055,990, dated Apr. 25, 2018, 3 pp.
Amendment in Response to Office Action dated Aug. 24, 2017, from U.S. Appl. No. 15/055,990, filed Nov. 22, 2017, 27 pp.
Office Action from U.S. Appl. No. 15/055,990, dated Aug. 24, 2017, 26 pp.
Rosen et al., "BGP/MPLS IP Virtual Private Networks (VPNs)," RFC 4364, Network Working Group, Feb. 2006, 47 pp.
U.S. Appl. No. 14/927,451, by Gagan Maheshwari, filed Oct. 29, 2015.
U.S. Appl. No. 15/055,990, by Kirk Allan Felbinger, filed Feb. 29, 2016.
U.S. Appl. No. 15/099,407, by Juxiang Teng, filed Apr. 14, 2016.
Vargas et al., "Brief: Service Marketplaces Create a Hub for Your Hybrid Ecosystem," for Infrastructure & Operations Professionals, Apr. 22, 2015, 6 pp.
Office Action from U.S. Appl. No. 15/055,990, dated Aug. 15, 2018, 15 pp.
Amendment in Response to Office Action dated Aug. 15, 2018, from U.S. Appl. No. 15/055,990, filed Nov. 15, 2018, 24 pp.

* cited by examiner

RECOMMENDATION ENGINE FOR SIMULATED COLOCATION AT INTERCONNECTION FACILITIES

This application claims the benefit of U.S. Provisional Application No. 62/197,356, filed Jul. 27, 2015, the entire content of which is incorporated herein by reference.

TECHNICAL FIELD

The invention relates to computer networks and, more specifically, to an interconnection facility for interconnecting customers of the interconnection facility provider.

BACKGROUND

An interconnection facility provider (a "provider") may employ a communication facility, such as a data center or warehouse, in which multiple customers of the provider locate network, server, and storage gear and interconnect to a variety of telecommunications, cloud, and other network service provider(s) with a minimum of cost and complexity. Such interconnection facilities may be shared by the multiple customers. By using interconnection facilities of the provider, customers of the provider including telecommunications providers, Internet Service Providers (ISPs), application service providers, service providers, content providers, and other providers, as well as enterprises, enjoy less latency and the freedom to focus on their core business. Additionally, customers may reduce their traffic back-haul costs and free up their internal networks for other uses.

SUMMARY

In general, techniques of the disclosure are directed to providing scoring data for at least one prospective interconnection facility in order to provide interconnection and/or co-location recommendations for a particular customer with respect to one or more geographically-distributed interconnection facilities. To provide this scoring data, a recommendation engine executing at a computing device obtains a list of prospective interconnection facilities and a list of prospective interconnection facility customers for the particular customer. Based at least in part on querying telemetry data that indicates interconnections among interconnection facility customers within a plurality of interconnection facilities administered by an interconnection facility provider, the recommendation engine identifies sets of interconnection facilities from the plurality of interconnection facilities in which respective interconnection facility customers are configured with existing interconnections. Based at least in part on the list of prospective interconnection facilities, the identified sets of interconnection facilities, and the list of prospective interconnection facility customers, the recommendation generates scoring data for the prospective interconnection facilities for the particular customer. For example, the recommendation engine may determine scoring data in which an interconnection facility having relatively more prospective interconnections for the particular customer is given a relatively higher score than another interconnection facility having relatively fewer prospective interconnections for the particular customer.

The recommendation engine may then output the scoring data for display to the particular interconnection facility customer. In some examples, the recommendation engine may determine scoring data with respect to a set of prospective customers provided by the particular interconnection facility customer or with respect to a set of prospective customers determined by the recommendation engine based on a set of criteria provided by the particular interconnection facility customer.

In some examples, scoring data for an interconnection facility may be determined according to such criteria as compatibility with selection criteria between the particular customer and each of the set of prospective customers currently located at and having at least one interconnection configured at the interconnection facility. The recommendation engine may make compatibility determinations based on interconnection selection criteria between the particular customer and a prospective customer, which may include industry, target market attributes, services provided/consumed (e.g., cloud, IT, network, content & digital media, financial, and enterprise), and similarities in customer profiles between the prospective customers and customers currently configured with an interconnection with the particular customer. As such, the recommendation may weight this relative likelihood in determining the scoring data for the particular customer.

The scoring data may facilitate strategic and intelligent interconnection and co-location planning by a requesting customer. That is, the scoring data may provide intelligence by which the customer may determine those interconnection facilities in which to colocate customer infrastructure with the prospect of interconnection with colocated consumers of the customer's network services.

In one example, the disclosure is directed to a method comprising: obtaining, by a recommendation engine executing at a computing device, a list of prospective interconnection facilities administered by an interconnection facility provider and a list of prospective interconnection facility customers; identifying, by the recommendation engine, based at least in part on querying telemetry data that indicates interconnections of interconnection facility customers within the list of prospective interconnection facilities administered by an interconnection facility provider, sets of interconnection facilities from the list of prospective interconnection facilities in which respective interconnection facility customers are configured with existing interconnections; generating, by the recommendation engine and based at least in part on: the list of prospective interconnection facilities, the sets of interconnection facilities, and the list of prospective interconnection facility customers, scoring data for the prospective interconnection facilities; and outputting, by the recommendation engine and for display to a user, the scoring data.

In another example, the disclosure is directed to a computing device comprising: one or more computer processors; and a memory comprising instructions that when executed by the one or more computer processors cause the one or more computer processors to: obtain a list of prospective interconnection facilities administered by an interconnection facility provider and a list of prospective interconnection facility customers; identify based at least in part on querying telemetry data that indicates interconnections of interconnection facility customers within the list of prospective interconnection facilities administered by an interconnection facility provider, sets of interconnection facilities from the list of prospective interconnection facilities in which respective interconnection facility customers are configured with existing interconnections; generate, based at least in part on: the list of prospective interconnection facilities, the sets of interconnection facilities, and the list of prospective interconnection facility customers, scoring data for the prospective interconnection facilities; and output, for display to a user, the scoring data.

In another example, the disclosure is directed to a method comprising: obtaining, by a recommendation engine executing at a computing device, a set of prospective interconnection facilities administered by an interconnection facility provider and a set of prospective interconnection facility customers; determining, by the recommendation engine for each interconnection facility from the set of interconnection facilities and based at least in part on querying telemetry data that indicates interconnections configured within the set of prospective interconnection facilities, interconnections configured within the interconnection facility for the set of prospective interconnection facility customers; generating, by the recommendation engine for each interconnection facility from the set of interconnection facilities and based on the determined interconnections, scoring data indicating a value of prospective interconnections at each interconnection facility from the set of interconnection facilities; and outputting, by the recommendation engine to a user, the scoring data.

In another example, the disclosure is directed to a computing device comprising: one or more computer processors; and a memory comprising instructions that when executed by the one or more computer processors cause the one or more computer processors to: obtain a set of prospective interconnection facilities administered by an interconnection facility provider and a set of prospective interconnection facility customers; determine, for each interconnection facility from the set of interconnection facilities and based at least in part on querying telemetry data that indicates interconnections configured within the set of prospective interconnection facilities, interconnections configured within the interconnection facility for the set of prospective interconnection facility customers; generate, for each interconnection facility from the set of interconnection facilities and based on the determined interconnections, scoring data indicating a value of prospective interconnections at each interconnection facility from the set of interconnection facilities; and output, to a user, the scoring data.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

Like reference characters denote like elements throughout the figures and text.

DETAILED DESCRIPTION

Figure 1:
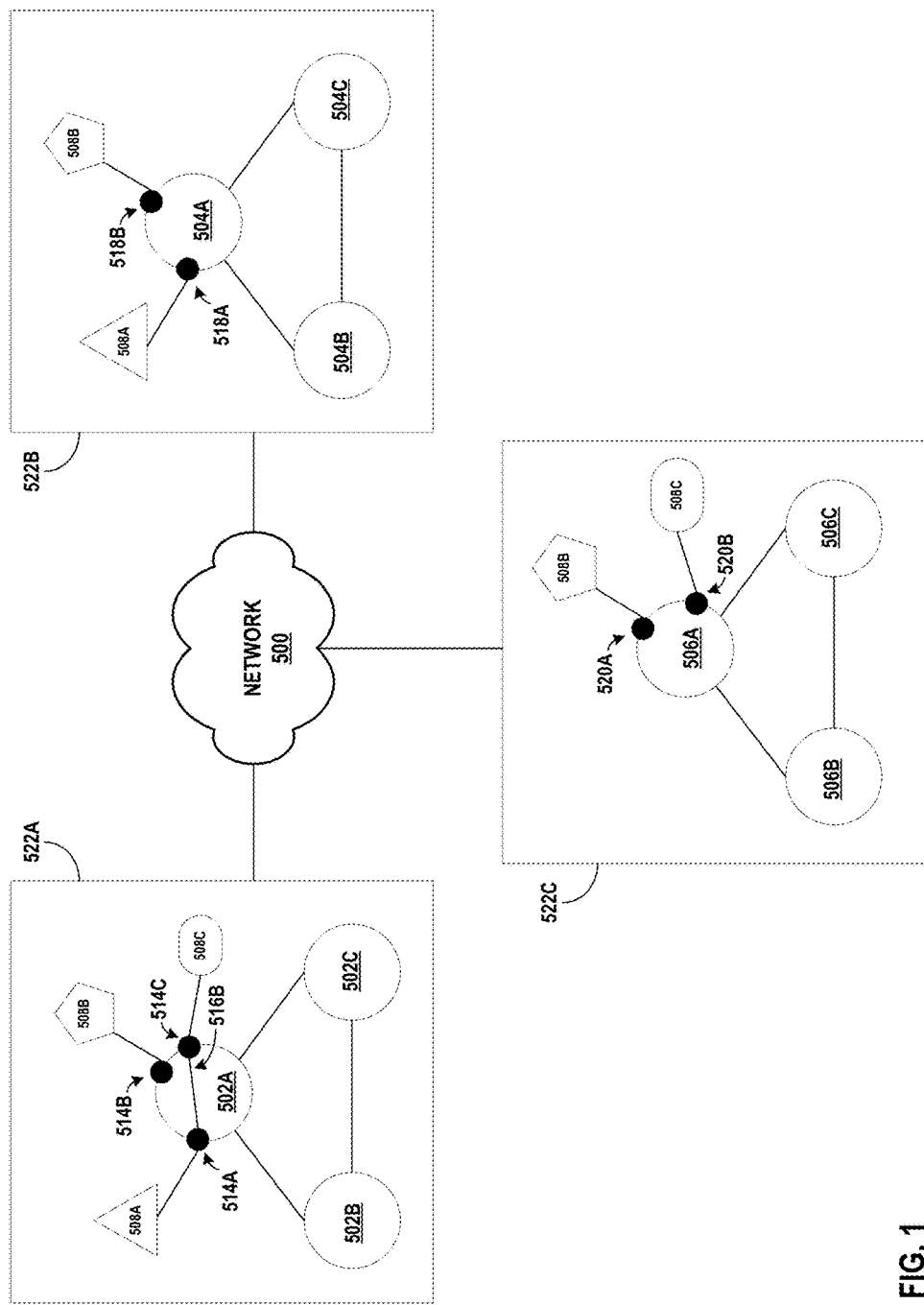
FIG. 1 is a conceptual diagram illustrating co-location and interconnection opportunities between one or more interconnection facility users, in accordance with one or more techniques of the disclosure.

Cloud computing refers to the use of dynamically scalable computing resources accessible via a network, such as the Internet. Computing resources, often referred to as a "cloud," provide one or more services to users. These services may be categorized according to service types, which may include for examples, applications/software, platforms, infrastructure, virtualization, and servers and data storage. The names of service types are often prepended to the phrase "as-a-Service" such that the delivery of applications/software and infrastructure, as examples, may be referred to as Software-as-a-Service (SaaS) and Infrastructure-as-a-Service (IaaS), respectively.

The term "cloud-based services" or, more simply, "services" refers not only to services provided by a cloud, but also to a form of service provisioning in which customers contract with service providers for the online delivery of services provided by the cloud. Service providers manage a public, private, or hybrid cloud to facilitate the online delivery of services to one or more customers. In some instances, multiple customers and service providers may have physical and/or logical network interconnections at interconnection facility points that provide for high-speed transmission of information between the customers and service providers. However, in some instances, customers and/or service providers may be unaware of potential interconnection opportunities at geographically dispersed interconnection facility points, including potential interconnection opportunities at interconnection facility points the customer does not have a presence in.

An interconnection facility provider ("provider") employs network infrastructure within an interconnection facility that enables customers to connect, using interconnections established within the network infrastructure by the provider, to one another to receive and transmit data for varied purposes. For instance, an interconnection facility may provide data transport services one or more cloud-based services. The interconnection facility in this way offers customers connectivity to a vibrant ecosystem of additional customers including content providers, Internet service providers, carriers, and enterprises. Customers of the interconnection facility may connect for such end-uses as service delivery, content delivery, financial services, and Internet access, to give just a few examples.

As used herein, the term "customer" of the interconnection facility provider or "interconnection facility user" may refer to a tenant of at least one interconnection facility employed by the interconnection facility provider, whereby the customer leases space within the interconnection facility in order to colocate with other tenants for improved efficiencies over independent facilities as well as to interconnect network equipment with the other tenants'/customers' network equipment within the interconnection facility or campus for reduced latency/jitter and improved reliability, performance, and security versus transport networks, among other reasons.

An interconnection facility may provide one or more different types of interconnections between customer networks for customers colocated in the interconnection facility. For instance, an interconnection facility may provide physical or "layer-1" (in the Open Systems Interconnection model (OSI Model)) interconnections between interconnection facility users. Physical interconnections may include physical cross-connects that are established by category 5 or 6 (cat 5/6) cables, coaxial cables, and/or fiber optic cables, for instance. In some examples, an interconnection facility may provide a data link or "layer-2" (in the OSI Model) interconnections between interconnection facility users. In some examples, an interconnection facility that provides layer-2 interconnections may be referred to as an Ethernet Exchange, where Ethernet is the underlying layer-2 protocol. In some examples, an interconnection facility may provide network and/or transfer or "layer-3/4" (in the OSI Model) interconnections between interconnection facility users. In some examples, an interconnection facility that providers layer-3/4 interconnections may be referred to an Internet Exchange, where TCP/IP are the underlying layer-3/4 protocols. For example, an interconnection facility that provides an Internet Exchange may allow customer routers to directly peer with one another using a layer-3 routing protocol, such as Border Gateway Protocol, to exchange routes for facilitating layer-3 traffic exchange. In some examples, an interconnection facility may provide indirect layer-3 routing protocol peering whereby each customer announces its layer-3 routes to an autonomous system (AS) deployed by the interconnection facility provider within the interconnection facility network infrastructure. The AS may then relay these routes in conjunction with tunneling or other forwarding information to establish an interconnection between customers. In some examples, an interconnection facility that provides indirect layer-3 routing protocol peering to facilitate service traffic exchange in this way may be referred to as a Cloud-based Services Exchange or, more simply, a Cloud Exchange. Additional description of a cloud exchange is found in U.S. Provisional Appl. No. 62/149,374, filed Apr. 17, 2015, entitled "CLOUD-BASED SERVICES EXCHANGE," the entire content of which is incorporated by reference herein.

In some examples, a "connection" may be a physical or logical coupling between an interconnection facility user in a customer or provider network and an interconnection facility point. An "interconnection" may be a physical or logical coupling between connections that couple at least two interconnection facility users. As such, a network infrastructure configuration within an interconnection facility that enables customer networks to connect to exchange data may be referred to herein as an "interconnection." A cross-connect interconnection may refer to a physical coupling between two interconnection facility users. An Ethernet interconnection may be a layer-2 coupling between two interconnection facility users. An Internet exchange interconnection may be a layer-3/4 coupling between two interconnection facility users. The foregoing examples of interconnection facilities and interconnections are exemplary only and many other types of interconnection facilities and interconnections are possible.

FIG. 1 is a conceptual diagram illustrating co-location and interconnection opportunities between one or more interconnection facility users, in accordance with one or more techniques of the disclosure. FIG. 1 illustrates multiple geographically distributed interconnection facilities 522A-522B. Each of interconnection facilities 522A-522C may be separated by a distance of 50 miles or more in some examples. As shown in FIG. 1, interconnection facility 522A includes multiple, interconnected interconnection facility points 502A-502C. Similarly, interconnection facility 522B includes multiple, interconnected interconnection facility points 504A-504C, and interconnection facility 522C includes multiple, interconnected interconnection facility points 506A-506C.

In the example of FIG. 1, interconnection facility point 502 includes connections 514A-516C by interconnection facility users 508A-508C. For instance, interconnection facility user 508A may be a system or network of the user that is coupled to interconnection facility point 502A by connection 514A. Similarly, interconnection facility user 508B may be a system or network of the user that is coupled to interconnection facility point 502A by connection 514B. Interconnection facility user 508C may be a system or network of the user that is coupled to interconnection facility point 502A by connection 514B. FIG. 1 further illustrates two interconnections 516A and 516B. Interconnection 514A may be a physical or logical coupling between connections 514A and 514B that couple interconnection facility user 508A to interconnection facility user 508B. Interconnection 514B may be a physical or logical coupling between connections 514A and 514C that couple interconnection facility user 508A to interconnection facility user 508B. As described above, a cross-connect interconnection may refer to a physical coupling (e.g., fiber or Cat5/6 cable between two network devices and/or systems of interconnection facility users). An Ethernet interconnection may be a layer-2 coupling between two interconnection facility users, such as one or more Virtual Local Area Networks (VLANs) or other logical networks providing L2 reachability. An Internet exchange interconnection may be a layer-3/4 coupling between two interconnection facility users, such as a layer-3 network path provided by an Internet Exchange. In some examples, an interconnection may be a virtual circuit established at least in part within an interconnection facility.

In some examples, one or more of interconnections 514 may be based on an order for an interconnection being fulfilled by programmable network platform 120 and represented in customer data 602 and/or interconnection data 604. For instance, in some examples, recommendation engine 634 may determine or receive information indicating one or more of interconnections 514 from customer records rather than from a network itself that indicates two customers have a connection. As such, an interconnection entry stored in one or more of customer data 602 and/or 604 may represent a real or actual interconnection in the form of a cable, configuration, and/or virtual connection.

Interconnection facility 522C illustrates an interconnection opportunity between interconnection facility user 508A and interconnection facility user 508B. Recommendation engine 134 may receive, as input, a list of prospective interconnection facilities that includes interconnection facility 522C, as well as a list of prospective interconnection customers generated from user input or a list of criteria that includes interconnection facility user 508B. For instance, recommendation engine 134 of FIG. 1, may determine that interconnection facility user 508A and interconnection facility user 508B have no existing interconnections. In other words, a prospective interconnection facility user need not be a current peer/customer of the requesting customer 504A. Recommendation engine 134 may further determine, for interconnection facility 522C, that interconnection facility user 508A does not have a presence in interconnection facility 522C. Accordingly, recommendation engine 134 may determine that a prospective presence may be created in interconnection facility 522C, allowing interconnection facility user 508A to connect with interconnection facility user 508B in three different interconnection facilities. As such recommendation engine 134 may output scoring data indicating prospective interconnection facility 508C to interconnection facility user 508A that includes a score for the prospective interconnection with interconnection facility user 508B. In some examples, the scoring data may be a count of prospective interconnections at prospective interconnection facility 508C. In some instances, this count may further be adjusted based on various characteristics of the prospective interconnection facility user 508B.

Upon generating scores, such as counts, for each prospective interconnection facility, recommendation engine 134 may output display data indicating interconnection opportunities to interconnection facility user 508A. For instance, the interconnection opportunities may be based on the counts which may indicate a number of prospective interconnections that may be made if interconnection facility user 508A establishes a presence in a respective interconnection facility and establishes connections with other interconnection facility customers that interconnection facility user 508A is currently not connected with at the other interconnection facilities. In some examples, recommendation engine 134 may rank the scores, such as in descending order. In this way, interconnection facility user 508A may determine which prospective interconnection facilities would provide the most prospective interconnections. The outputted scores may be expanded such that each prospective interconnection customer at each prospective interconnection facility is visible. In some examples, each prospective interconnection customer may further have particular scoring data generated that is visible.

Figure 2:
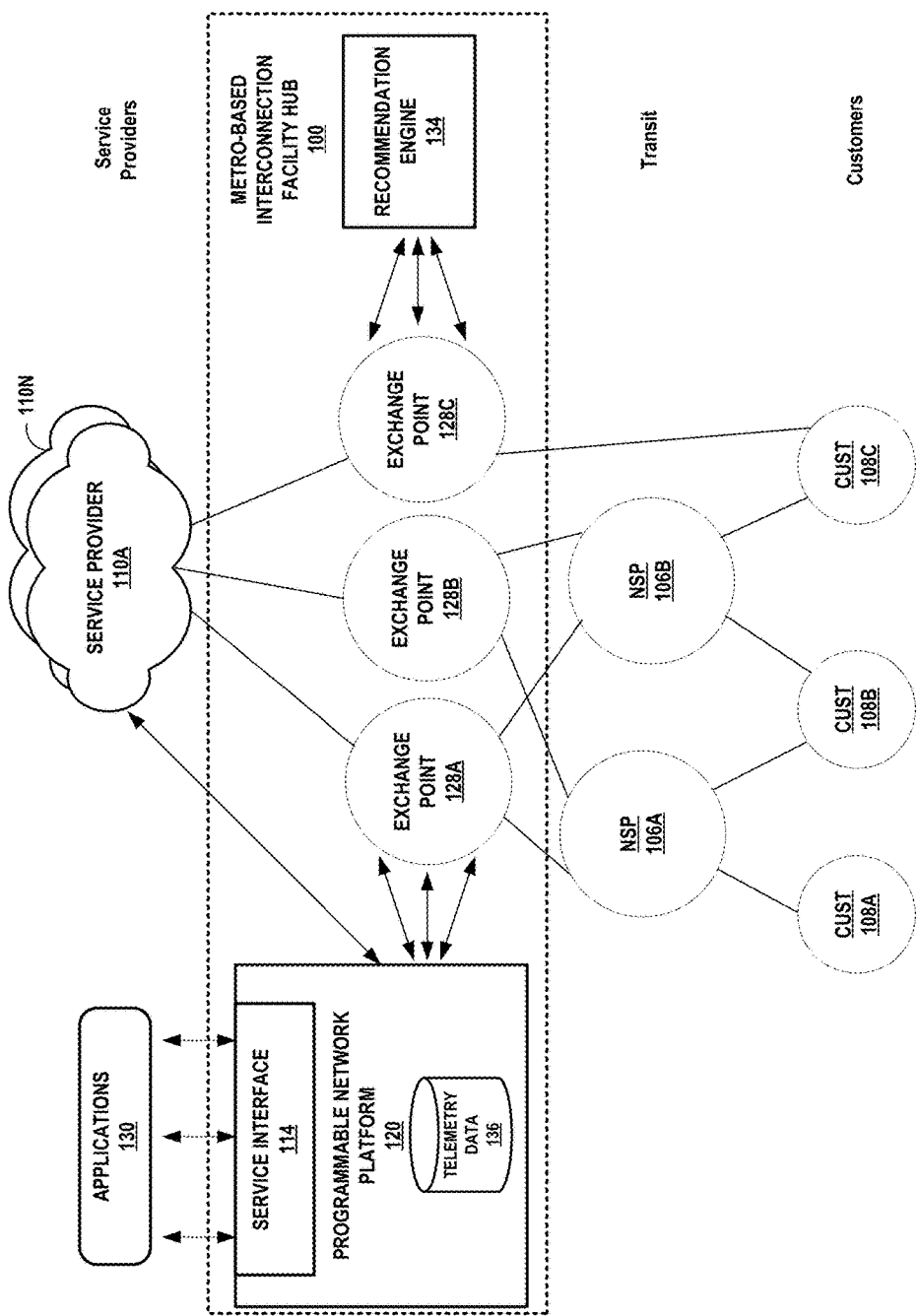
FIG. 2 is a block diagram that illustrates techniques for providing scoring data based on existing interconnection and service affinities between service customers and service providers at an interconnection facility, in accordance with techniques of the disclosure.

FIG. 2 is a block diagram that illustrates techniques for providing scoring data based on existing interconnection and service affinities between service customers and service providers at an interconnection facility, in accordance with techniques of the disclosure. For instance, metro-based interconnection facility hub 100 may enable customers 108A-108C ("customers 108") to bypass the public Internet to directly connect to services providers 110A-100N ("SPs 110" or "service providers 110") so as to improve performance, reduce costs, increase the security and privacy of the connections, and leverage cloud computing for additional applications. The multiple SPs 110 participate in the interconnection facility by virtue of their having at least one accessible port in the interconnection facility by which a customer can connect to the one or more services offered by the SPs 110, respectively. According to various examples described herein, metro-based interconnection facility hub 100 may allow private networks of any customer to be directly cross-connected to any other customer at a common point, thereby allowing direct exchange of network traffic between the networks of the customers. Customers may include network carriers 106A-106B (collectively, "NSPs 106," or alternatively, "carriers 106"), enterprises, and other users of services offered by one or more service providers.

FIG. 2 illustrates a conceptual view of a network system 2 providing metro-based interconnection in which multiple interconnection facility points located in a metropolitan area enable interconnection according to techniques described herein. Each of interconnection facility points 128A-128D (described hereinafter as "interconnection facility points" and collectively referred to as "interconnection facility points 128") of metro-based interconnection facility hub 100 (alternatively, "metro 100") may represent a different data center geographically located within the same metropolitan area ("metro" or "metro-based," e.g., in New York City, N.Y.; Silicon Valley, Calif.; Seattle-Tacoma, Wash.; Minneapolis-St. Paul, Minn.; London, UK; etc.) to provide resilient and independent interconnection facilities by which customers and service providers connect to receive and provide, respectively, services. In other words, metro 100 may include multiple interconnection facilities geographically located with a metropolitan area. In some examples, each of the multiple interconnection facilities geographically located with a metropolitan area may have low-latency links that connect the multiple interconnection facilities in a topology to provide metro-based interconnection services between customers receiving interconnection services at different interconnection facilities in the metro-based interconnect facility hub. In various examples, metro-based interconnection facility hub 100 may include more or fewer interconnection facility points 128. In some instances, metro-based interconnection facilities 100 may include just one interconnection facility point 128. An interconnection facility provider may deploy instances of interconnection facilities 100 in multiple different metropolitan areas, each instance of metro-based interconnection facility hub 100 having one or more interconnection facility points 128.

Each of interconnection facility points 128 includes network infrastructure and an operating environment by which customers 108 receive services from multiple SPs 110. As noted above, an interconnection may refer to, e.g., a physical cross-connect, an Ethernet connection such as a Layer 2 VPN or virtual private LAN (e.g., E-LINE, E-LAN, E-TREE, or E-Access), an Internet exchange-based interconnection in which respective routers of interconnected customers directly peer and exchange layer 3 routes for service traffic exchanged via the metro-based interconnection facilities 100, and a cloud exchange in which customer routers peer with metro-based interconnection facilities 100 (or "provider") routers rather than directly with other customers. A prospective interconnection may similarly refer to a prospect of connecting to a customer using any of the above types of interconnections, for instance.

For interconnections at layer-3 or above, customers 108 may receive services directly via a layer 3 peering and physical connection to one of interconnection facility points 128 or indirectly via one of NSPs 106. NSPs 106 provide "transit" by maintaining a physical presence within one or more of interconnection facility points 128 and aggregating layer 3 access from one or customers 108. NSPs 106 may peer, at layer 3, directly with one or more interconnection facility points 128 and in so doing offer indirect layer 3 connectivity and peering to one or more customers 108 by which customers 108 may obtain services from the metro-based interconnection facility hub 100.

In instances in which interconnection facilities 128 offer a cloud exchange, each of interconnection facility points 128, in the example of FIG. 2, is assigned a different autonomous system number (ASN). For example, interconnection facility point 128A is assigned ASN 1, interconnection facility point 128B is assigned ASN 2, and so forth. Each interconnection facility point 128 is thus a next hop in a path vector routing protocol (e.g., BGP) path from service providers 110 to customers 108. As a result, each interconnection facility point 128 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more service providers 110 to customers. In other words, interconnection facility points 128 may internalize the eBGP peering relationships that service providers 110 and customers 108 would maintain on a pair-wise basis. Instead, a customer 108 may configure a single eBGP peering relationship with an interconnection facility point 128 and receive, via the interconnection facility, multiple services from one or more service providers 110. While described herein primarily with respect to eBGP or other layer 3 routing protocol peering between interconnection facility points and customer, NSP, or service provider networks, the interconnection facility points may learn routes from these networks in other way, such as by static configuration, or via Routing Information Protocol (RIP), Open Shortest Path First (OSPF), Intermediate System-to-Intermediate System (IS-IS), or other route distribution protocol.

As examples of the above, customer 108D is illustrated as having contracted with an interconnection facility provider for metro-based interconnection facility hub 100 to directly access layer 3 services via interconnection facility points 128C, 128D. In this way, customer 108D receives redundant layer 3 connectivity to service provider 110A, for instance. Customer 108C, in contrast, is illustrated as having contracted with the interconnection facility provider for metro-based interconnection facility hub 100 to directly access layer 3 services via interconnection facility point 128C and also to have contracted with NSP 106B to access layer 3 services via a transit network of the NSP 106B. Customer 108B is illustrated as having contracted with multiple NSPs 106A, 106B to have redundant access to interconnection facility points 128A, 128B via respective transit networks of the NSPs 106A, 106B. The contracts described above are instantiated in network infrastructure of the interconnection facility points 128 by L3 peering configurations within switching devices of NSPs 106 and interconnection facility points 128 and L3 connections, e.g., layer 3 virtual circuits, established within interconnection facility points 128 to interconnect service provider 110 networks to NSPs 106 networks and customer 108 networks, all having at least one port offering connectivity within one or more of the interconnection facility points 128.

As shown in FIG. 2, programmable network platform 120 may include telemetry data 136. Telemetry data 126 may include metrics about the quantity, type, and definition of network and resource configurations that are configured by programmable network platform 120. Telemetry data 126 may include analytics information from infrastructure data collectors based on raw metrics data for resources used in a particular service.

In some examples, telemetry data 126 may include information that indicates connections of interconnection facility users to interconnection facility points. For instance, an interconnection facility user may include a service customer or service provider. In some examples, a connection may be a physical or logical (e.g., L2 or L3) coupling between an interconnection facility user in a user network (e.g., customer network or provider network) and an interconnection facility point. Telemetry data 126 may include information that indicates interconnections between interconnection facility users at an interconnection facility point. In some examples, an interconnection may be a physical or logical coupling between at least two interconnection facility users in an interconnection facility point.

As shown in FIG. 2, recommendation engine 134 may be included in metro-based interconnection facility hub 100. In other examples, recommendation engine 134 may be implemented within programmable network platform 120. In some examples, recommendation engine 134 may be implemented outside of metro-based interconnection facility hub 100, such as in a different geographic location than metro-based interconnection facility hub 100. In any case, recommendation engine 134 may be operably coupled to programmable network platform 120, such that recommendation engine 134 may communicate with programmable network platform 120. As described in this disclosure, recommendation engine 134 may be implemented in hardware, software, or a combination of hardware and software.

In accordance with techniques of the disclosure, recommendation engine 134 may determine interconnection opportunities based on scoring data of prospective interconnections between a particular interconnection facility customer and prospective interconnection facility customers with which the particular interconnection facility customer is not yet interconnected and located at an interconnection facility where the particular interconnection facility customer does not have a presence, and output such scoring data as opportunities to the particular interconnection facility customer. An interconnection opportunity may exist when the particular interconnection facility customer does not have an interconnection with a target interconnection facility user at the target interconnection facility, and the particular interconnection facility customer is not co-located with the target interconnection facility user in a particular interconnection facility. A target (or prospective) interconnection facility may be an interconnection facility at which the particular interconnection facility customer does not yet have a presence. For instance, a device operating at the particular interconnection facility customer may use techniques of this disclosure for viewing opportunities to connect with other interconnection facility customers at other interconnection facilities when considering expansion. As further described herein, recommendation engine 134 may provide the particular interconnection facility user with an indication of the interconnection opportunity to the other interconnection facility user at the particular interconnection facility.

In operation, to generate scoring data, recommendation engine 134 may obtain a list of prospective interconnection facilities and a list of prospective interconnection facility customers from programmable network platform 120. Recommendation engine 134 may identify sets of interconnection facilities from the plurality of interconnection facilities in which respective interconnection facility customers are configured with existing interconnections based at least in part on querying telemetry data that indicates interconnections of interconnection facility customers within a plurality of interconnection facilities administered by an interconnection facility provider. For instance, recommendation engine 134 may determine an interconnection facility user identifier that identifies a particular interconnection facility user. Recommendation engine 134 may send a request or query to programmable network platform 120 for a set of interconnections that identify the target services users to which the particular interconnection facility user is already interconnected. In some examples, the set of interconnections may specify service identifiers of the target interconnection facility users, geographic locations of interconnection facilities, and/or identifiers of interconnection facilities that include the interconnections, to name only a few examples. In some examples, the specific interconnection facilities and interconnection facility customers identified herein may be specified by the particular interconnection facility customer.

Recommendation engine 134 may generate, based at least in part on the list of prospective interconnection facilities, the sets of interconnection facilities, and the list of prospective interconnection facility customers, scoring data for the prospective interconnection facilities. For example, the scoring data may be scoring data for a plurality of prospective interconnections between a particular interconnection facility customer and a prospective interconnection facility customer of the list of prospective interconnection facility customers at a prospective interconnection facility of the list of prospective interconnection facilities. In such an example, the scoring data may be further based on at least one characteristic of the particular interconnection facility customer and at least one characteristic of the prospective interconnection facility customer. In other words, based on the characteristics of the particular interconnection facility customer and the prospective interconnection facility customer, scoring data may be generated that indicates how close of a match the two interconnection facility customers may be, or that indicates how profitable an attempted match between the two interconnection facility customers may be. In other examples, the scoring data may be associated with an aggregation of the scoring data described above for each respective prospective interconnection facility. In such an example, the scoring data may indicate which prospective interconnection facility provides the most opportunities for close matches or which prospective interconnection facility has the highest projected profits based on characteristics of the interconnection facilities. In still other examples, the scoring data may indicate a count of interconnection facility opportunities at the prospective interconnection facility. For instance, the scoring data may indicate an absolute number of prospective interconnection facility customers located at the prospective interconnection facility.

In some examples, recommendation engine 134 may output, for display to the particular customer, the scoring data. For instance, recommendation engine 134 may output for display a set of interconnection opportunities. Each interconnection opportunity may specify a target interconnection facility user with which the particular interconnection facility user may establish an interconnection at a particular interconnection facility, accompanied with additional scoring data for each interconnection opportunity. In some examples, recommendation engine 134 may output the interconnection facility opportunities in a ranked ordering. The ranked ordering may be based on one or more criteria of the scoring data, such as but not limited to, count of prospective interconnections for each target interconnection facility, value of each prospective interconnection for each target interconnection facility, or a weighted score based on value and number of prospective interconnections, to name only a few examples. The particular interconnection facility user may evaluate the set of interconnection opportunities and communicate with the target interconnection facility users to establish interconnections.

Figure 3:
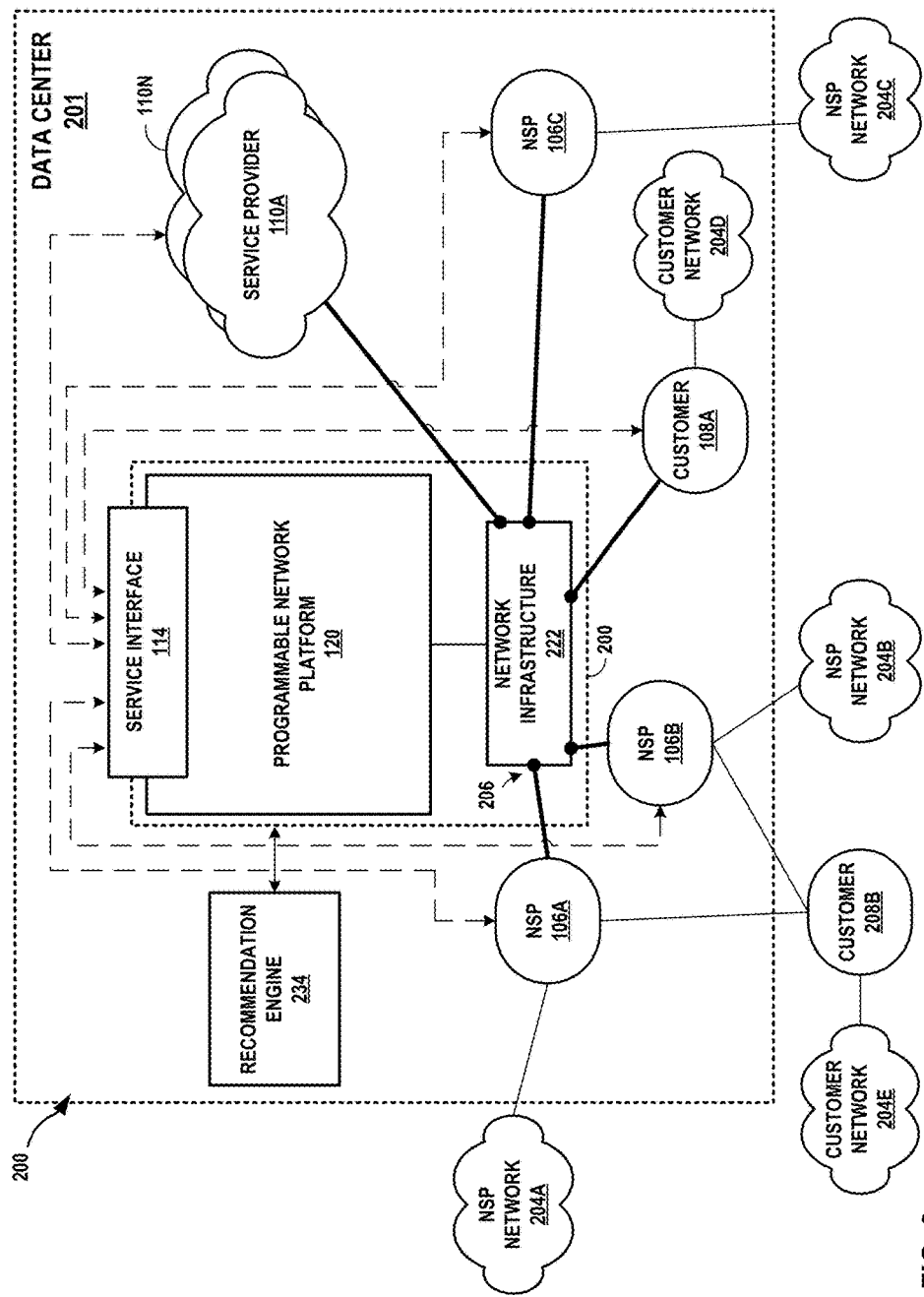
FIG. 3 is a block diagram illustrating a high-level view of a data center that provides an operating environment for an interconnection facility, and a recommendation engine that identifies co-location and interconnection opportunities within the data center, in accordance with techniques of the disclosure.

FIG. 3 is a block diagram illustrating a high-level view of a data center 201 that provides an operating environment for an interconnection facility 200, and a recommendation engine 234 that identifies co-location and interconnection opportunities within the data center, in accordance with techniques of the disclosure. Interconnection facility 200 ("interconnection facility 200") allows a corresponding one of customer networks 204D, 204E and NSP networks 204A-204C (collectively, "'private' or 'carrier' networks 204") of any NSPs 106A-106C or other customers including customers 107A, 107B to be directly cross-connected, via a layer 3 (L3) connection to any other customer network and/or to any of service providers 110A-110N, thereby allowing exchange of service traffic among the customer networks and SPs 110. Data center 201 may be entirely located within a centralized area, such as a warehouse or localized data center complex, and provide power, cabling, security, and other services to NSPs, customers, and service providers that locate their respective networks within the data center 201 (e.g., for co-location) and/or connect to the data center 201 by one or more external links.

Network service providers 106 may each represent a network service provider that is associated with a transit network by which network subscribers of the NSP 106 may access services offered by SPs 110 via the interconnection facility 200. In general, customers of SPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such services as are offered by the SPs 110 via the interconnection facility 200.

In this way, interconnection facility 200 streamlines and simplifies the process of partnering SPs 110 and customers 208 (indirectly via NSPs 106 or directly) in a transparent and neutral manner. One example application of interconnection facility 200 is a co-location and interconnection data center in which SPs 110, NSPs 106 and/or customers 107 may already have network presence, such as by having one or more accessible ports available for interconnection within the data center. This allows the participating carriers, customers, and SPs to have a wide range of interconnectivity options in the same facility. Interconnection facility 200 of data center 101 includes network infrastructure 122 that provides a L2/L3 switching fabric by which SPs 110 and customers/NSPs interconnect. This enables an NSP/customer to have options to create many-to-many interconnections with only a one-time hook up to the switching network and underlying interconnection platform 203 of interconnection facility 200. In other words, instead of having to establish separate connections across transit networks to access different service providers or different services of one or more service providers, interconnection facility 200 allows customers to interconnect to multiple SPs and services using network infrastructure 222 within data center 201.

By being connected to and utilizing interconnection facility 200, customers can purchase services and reach out to many end users in many different geographical areas without incurring the same expenses typically associated with installing and maintaining multiple virtual connections with multiple SPs 110. For example, NSP 106A can expand its services using network 204B of NSP 106B. By connecting to interconnection facility 200, a NSP 106 may be able to generate additional revenue by offering to sell its network services to the other carriers. For example, NSP 106C can offer the opportunity to use NSP network 204C to the other NSPs.

In some example implementations described herein, interconnection facility 200 includes an interconnection platform 203 that exposes a collection of software interfaces, which may include in some examples and are alternatively referred to herein as application programming interfaces (APIs) 214 in that the APIs 214 define the methods, fields, and/or other software primitives by which applications may invoke the interconnection platform 203. The software interfaces allow NSPs 206 and customers 208 programmable access to capabilities and assets of the interconnection facility 200. The interconnection platform 203 may alternatively be referred to as a controller, provisioning platform, provisioning system, etc., for establishing connectivity between customers and service providers according to techniques described herein.

On the buyer side, the software interfaces presented by the underlying interconnect platform provide an extensible framework that allows software developers associated with the customers of interconnection facility 200 (e.g., customers 208 and NSPs 206) to create software applications that allow and leverage access to the interconnect platform by which the applications may request that the interconnection facility establish connectivity to services offered by any of the SPs 110. For example, these buyer-side software interfaces (or "buyer APIs" of APIs 214) may allow customer applications for NSPs and enterprise customers, e.g., to obtain authorization to access the interconnection facility, obtain information regarding available services, obtain active ports and metro area details for the customer, create virtual circuits of varying bandwidth to access services, including dynamic selection of bandwidth based on a purchased service to create on-demand and need based virtual circuits to service providers, delete virtual circuits, obtain active virtual circuit information, obtain details surrounding SPs partnered with the interconnection facility provider, obtain customized analytics data, and validate partner access to interconnection assets.

On the provider (seller) side, the software interfaces may allow software developers associated with providers to manage their services and to enable customers to connect to their services. For example, these seller-side software interfaces (or "seller APIs" of APIs 214) may allow provider applications to obtain authorization to access the interconnection facility, obtain information regarding available services, obtain active ports and metro area details for the provider, obtain active port details in a given data center for the provider, approve or reject virtual circuits of varying bandwidth to access services created by customers, obtain virtual circuits pending addition and confirm addition of virtual circuits, obtain virtual circuits pending deletion and confirm deletion of virtual circuits, obtain customized analytics data, and validate partner access to interconnection assets.

As further described herein, the APIs 114 facilitate machine-to-machine communication to enable dynamic provisioning of virtual circuits in the interconnection facility for interconnecting customer and provider networks. In this way, the interconnection platform 103 enables the automation of aspects of services provisioning. For example, the software interfaces may provide an automated and seamless way for customers to establish, de-install and manage interconnection with multiple, different providers participating in the interconnection facility.

In some examples, interconnection facility 200 includes an API gateway 212 that executes one or more applications that expose software interfaces defined according to APIs 214. The applications may invoke services that correspond to endpoints of the APIs 214, and the services may themselves invoke the interconnection facility platform service of orchestration engine 218. API gateway 212 may execute on one or virtual machines and/or real servers of data center 201.

In some examples, interconnection facility includes an orchestration engine 218 that organizes, directs and integrates underlying software sub-systems 220 for managing various aspects of interconnection within the network infrastructure 222 as well as services management. The orchestration engine 218 may, for example, provide a rule-drive workflow engine that operates between the APIs 214 and the underlying interconnect platform of interconnection facility 200 that includes sub-systems 220 and network infrastructure 222. In this way, the orchestration engine 218 can be used by customer-proprietary applications and the APIs 214 for direct participation with the interconnection platform 203 of the interconnection facility 200. In other words, the orchestration engine 218 offers an "interconnection facility platform service" having various application engines to handle the API gateway 212 service requests.

As described in further detail below, sub-systems 220 may offer "interconnection facility services" invokable by orchestration engine 218. Sub-systems 220 and orchestration engine 218 may each be centralized or distributed applications and may execute on one or virtual machines and/or real servers of data center 201. Sub-systems 220 may include one or more sub-systems that configure routes, VRFs, VPNs, route targets, et al., within routing and switching devices of network infrastructure 222 so as to facilitate interconnection facility services with end-to-end layer 3 path provisioning.

In the example of FIG. 3, network infrastructure 222 represents the interconnection facility switching fabric and includes multiple ports that may be dynamically interconnected with virtual circuits by, e.g., invoking APIs 214 of the interconnection platform 203. Each of the ports is associated with one of carriers 106, customers 107, and SPs 110. Additional details of an example interconnection platform are described in U.S. Provisional Appl. No. 62/072,976, filed Oct. 30, 2014, entitled "INTERCONNECTION PLATFORM FOR REAL-TIME CONFIGURATION AND MANAGEMENT OF A CLOUD-BASED SERVICES EXCHANGE," the entire content of which is incorporated by reference herein.

As shown in FIG. 3, data center 201 may include recommendation engine 234. Recommendation engine 234 may be operably coupled to programmable network platform 120, such that recommendation engine 234 may communicate with programmable network platform 120. In accordance with techniques of the disclosure, recommendation engine 234 may determine scoring data for prospective interconnection facilities and prospective interconnection facility customers, and output such scoring data to interconnection facility users. Recommendation engine 234 may further provide a particular interconnection facility user with an indication of interconnection opportunity to other interconnection facility users at an interconnection facility where the particular interconnection facility customer does not currently have a presence.

In some examples, recommendation engine 234 may obtain a list of prospective interconnection facilities and a list of prospective interconnection facility customers. For example, a service provider may not have a presence in data center 201. As such, data center 201 may be included in the list of prospective interconnection facilities. Further, the service provider may not be connected to customer 108A in any interconnection facility. As such, customer 108A may be included in the list of prospective interconnection facility customers. Recommendation engine 234 may identify sets of interconnection facilities from the plurality of interconnection facilities in which respective interconnection facility customers are configured with existing interconnections based at least in part on querying telemetry data that indicates interconnections of interconnection facility customers within a plurality of interconnection facilities administered by an interconnection facility provider. Recommendation engine 234 may generate scoring data for the prospective interconnection facilities based at least in part on the list of prospective interconnection facilities, the sets of interconnection facilities, and the list of prospective interconnection facility customers. For example, given data center 201's inclusion in the list of prospective interconnection facilities may lead to recommendation engine 234 generating scoring data for data center 201 based on the prospective interconnection facility customers available to the service provider that the service provider does not have an interconnection with in any other facility. Recommendation engine 234 may output the scoring data for display to the service provider.

Figure 4A:
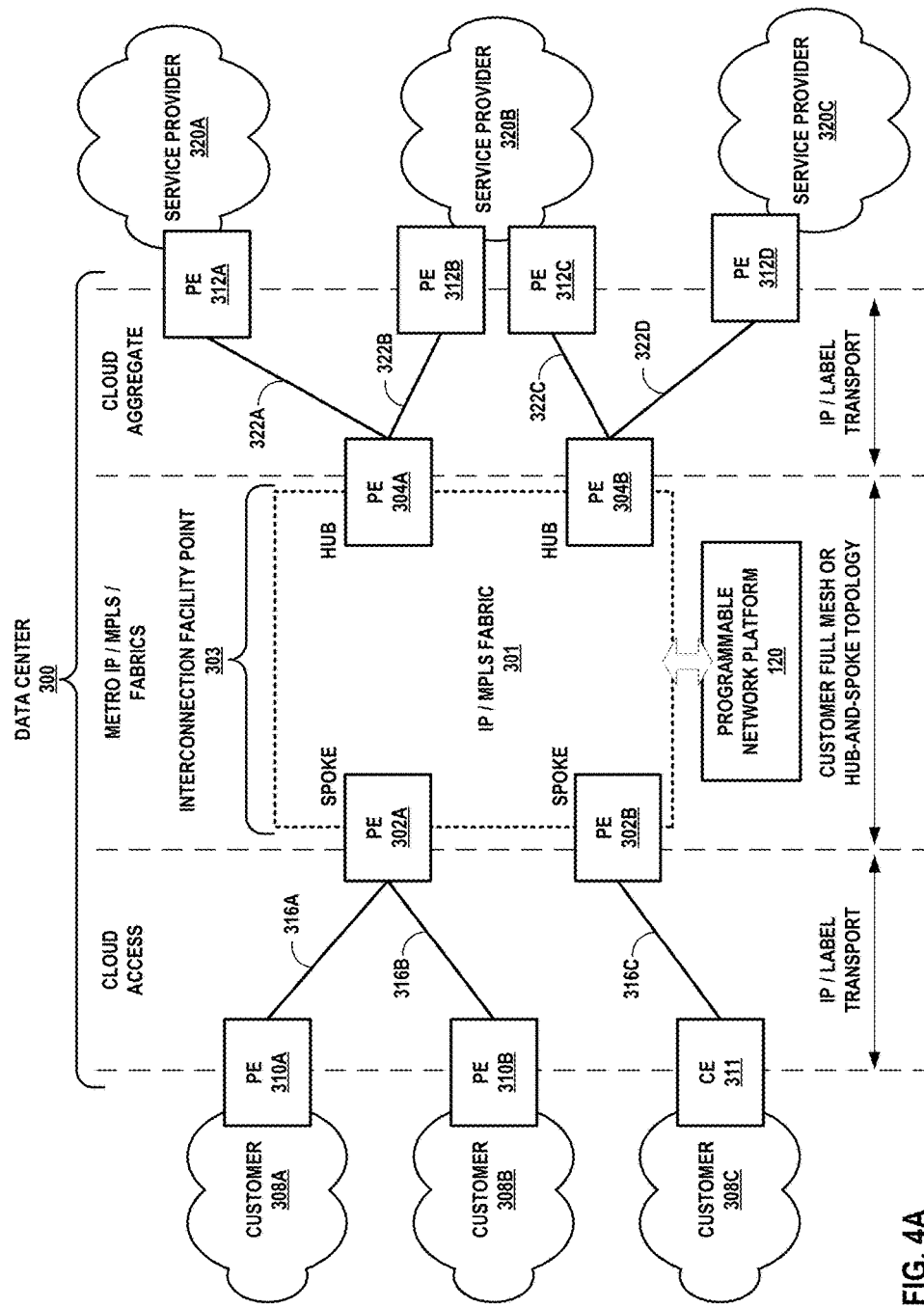
FIGS. 4A-4B are block diagrams illustrating example network infrastructure for an interconnection facility that includes interconnections in which a recommendation engine may provide scoring data, in accordance with techniques of the disclosure, in accordance with techniques described in this disclosure.
Figure 4B:
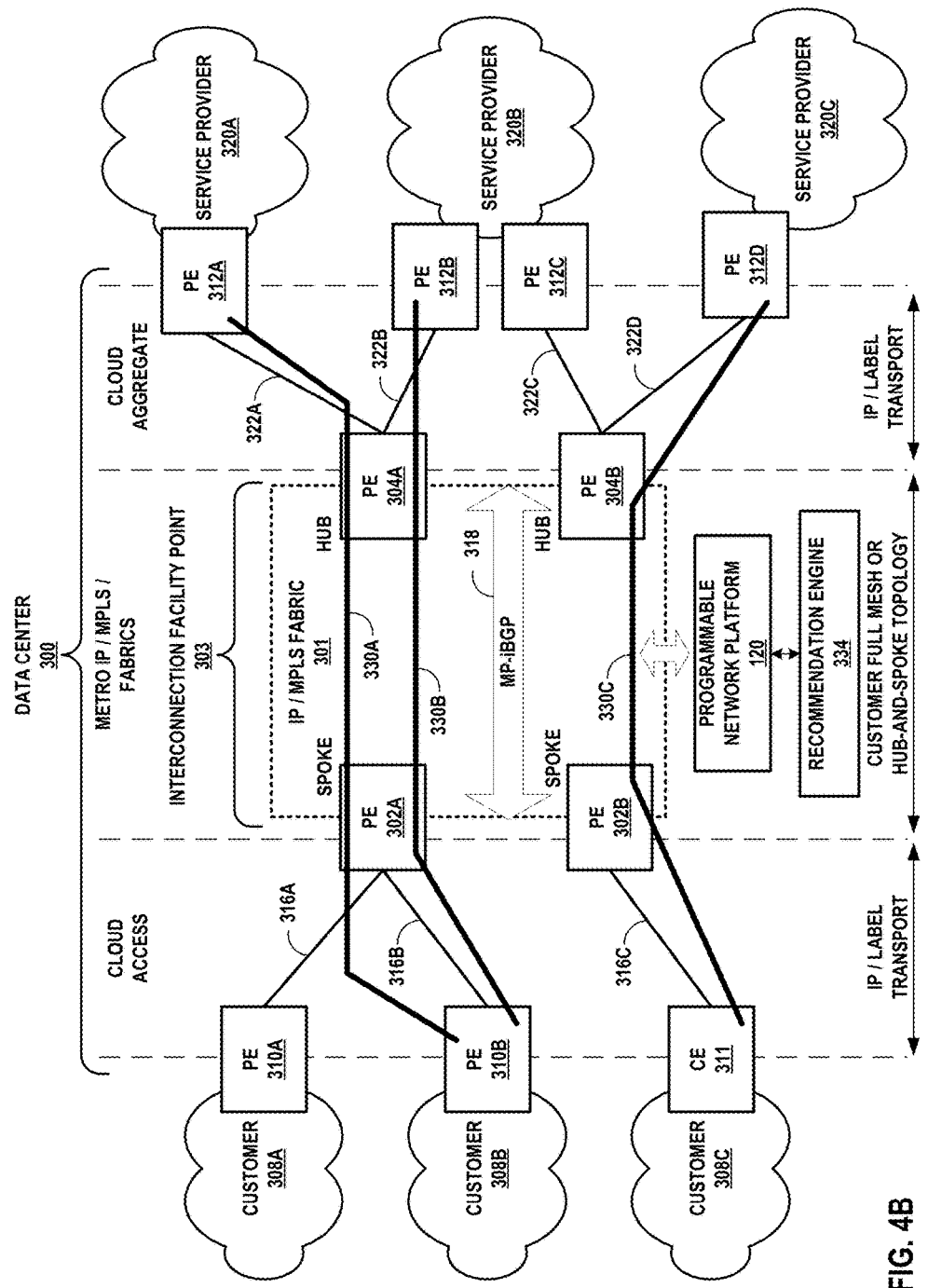

FIGS. 4A-4B are block diagrams illustrating example network infrastructure for an interconnection facility that includes interconnections in which a recommendation engine may provide scoring data, in accordance with techniques of the disclosure, in accordance with techniques described in this disclosure. In this example, customer networks 308A-308C (collectively, "customer networks 308"), each associated with a different customer, access an interconnection facility point within a data center 300 in order receive aggregated services from one or more service provider networks 320, each associated with a different service provider 110. Customer networks 308 each include endpoint devices that consume services provided by service provider network 320. Example endpoint devices include servers, smart phones, television set-top boxes, workstations, laptop/tablet computers, video gaming systems, teleconferencing systems, media players, and so forth.

Customer networks 308A-308B include respective provider edge/autonomous system border routers (PE/ASBRs) 310A-310B. Each of PE/ASBRs 310A, 310B executes exterior gateway routing protocols to peer with one of PE routers 302A-302B ("PE routers 302" or more simply "PEs 302") over one of network-to-network interface (NNI) links 316A-316B (collectively, "NNI links 316"). Additional details of NNI links and provisioning of NNI links to facilitate layer 2 connectivity within a data center 300 are found in U.S. Pat. No. 8,537,845, issued Sep. 17, 2013, and entitled "Real time configuration and provisioning for a carrier Ethernet exchange," which is incorporated by reference herein in its entirety. Each of NM links 316, 322 may include a network interface device (NID) that connects customer network 308 or service provider 328 to a network link between the NID and one of PE routers 302, 304. Each of NNI links 316, 322 may represent or include any of a number of different types of links that provide L3/network connectivity.

In this example, customer network 308C is not an autonomous system having an autonomous system number. Customer network 308C may represent an enterprise, network service provider, or other customer network that is within the routing footprint of the interconnection facility point. Customer network includes a customer edge (CE) device 311 that may execute exterior gateway routing protocols to peer with PE router 302B over NNI link 316C. In various examples, any of PEs 310A-310B may alternatively be or otherwise represent CE devices.

NNI links 316 include physical links and may include one or more intermediate switching devices. PE/ASBRs 310A-310B, CE device 311, and PE routers 302A-302B exchange layer 3 packets via NNI links 316. In this respect, NNI links 316 constitute transport links for access via interconnection facility point 303. Interconnection facility point 303 may represent an example of any of interconnection facility points 128. Data center 300 may represent an example of data center 201.

Interconnection facility point 303, in some examples, aggregates customers 308 access to the interconnection facility point 303 and thence to any one or more service providers 320. FIGS. 4A-4B, e.g., illustrate access links 316A-316B connecting respective customer networks 308A-308B to PE router 302A of interconnection facility point 303 and access link 316C connecting customer network 308C to PE router 302B. Any one or more of PE routers 302, 304 may comprise ASBRs. PE routers 302, 304 and IP/MPLS fabric 301 may be configured according to techniques described herein to interconnect any of NM links 316 to any of NNI links 322. As a result, service provider network 320A, e.g., needs only to have configured a single aggregate link (here, NNI link 322A) in order to provide services to multiple customer networks 308. That is, the service provider operating service provider network 302A does not need to provision and configure separate service links from service provider network 302A to each of PE routers 310, 311, for instance, in order to provide services to each of customer network 308. Interconnection facility point 303 may instead cross-connect aggregate NNI link 322A and PE 312A of service provider network 320A to multiple access NNI links 316 to provide layer 3 peering and network reachability for the services delivery.

In addition, a single customer network, e.g., customer network 308A, need only to have configured a single access link (here, NNI link 316A) to the interconnection facility point 303 within data center 300 in order to obtain services from multiple service provider networks 320 offering services via the interconnection facility point 303. That is, the customer or network service provider operating customer network 308A does not need to provision and configure separate service links connecting customer network 308A to different PE routers 312, for instance, in order to obtain services from multiple service provider networks 320. Interconnection facility point 303 may instead cross-connect access NNI link 316A (again, as one example) to multiple aggregate NNI links 322 to provide layer 3 peering and network reachability for the services delivery to customer network 308A.

Service provider networks 320 each includes servers configured to provide one or more services to users. These services may be categorized according to service types, which may include for examples, applications/software, platforms, infrastructure, virtualization, and servers and data storage. Example services may include content/media delivery, cloud-based storage, cloud computing, online gaming, IT services, etc.

Service provider networks 320 include PE routers 312A-312D that each executes an exterior gateway routing protocol, e.g., eBGP, to exchange routes with PE routers 304A-304B (collectively, "PE routers 304") of interconnection facility point 303. Each of service provider networks 320 may represent a public, private, or hybrid cloud. Each of service provider networks 320 may have an assigned autonomous system number or be part of the autonomous system footprint of interconnection facility point 303.

In the illustrated example, an Internet Protocol/Multiprotocol label switching (IP/MPLS) fabric 301 interconnects PEs 302 and PEs 304. IP/MPLS fabric 301 include one or more switching and routing devices, including PEs 302, 304, that provide IP/MPLS switching and routing of IP packets to form an IP backbone. In some example, IP/MPLS fabric 301 may implement one or more different tunneling protocols (i.e., other than MPLS) to route traffic among PE routers and/or associate the traffic with different IP-VPNs. In accordance with techniques described herein, IP/MPLS fabric 301 implement IP virtual private networks (IP-VPNs) to connect any of customers 308 with multiple service provider networks 320 to provide a data center-based 'transport' and layer 3 cross-connect. Whereas service provider-based IP backbone networks require wide-area network (WAN) connections with limited bandwidth to transport service traffic from layer 3 services providers to customers, the interconnection facility point 303 as described herein 'transports' service traffic and cross-connects service providers 320 to customers 308 within the high-bandwidth local environment of data center 300 provided by a data center-based IP/MPLS fabric 301. In some examples, IP/MPLS fabric 301 implements IP-VPNs using techniques described in Rosen & Rekhter, "BGP/MPLS IP Virtual Private Networks (VPNs)," Request for Comments 4364, February 2006, Internet Engineering Task Force (IETF) Network Working Group, the entire contents of which is incorporated by reference herein. In some example configurations, a customer network 308 and service provider network 320 may connect via respective NNI links to the same PE router of IP/MPLS fabric 301.

NNI links 316, 322 may include attachment circuits that associate traffic, exchanged with the connected customer network 308 or service provider network 320, with virtual routing and forwarding instances (VRFs) configured in PEs 302, 304 and corresponding to IP-VPNs operating over IP/MPLS fabric 301. For example, PE 302A may exchange IP packets with PE 310A on a bidirectional label-switched path (LSP) operating over NNI link 316A, the LSP being an attachment circuit for a VRF configured in PE 302A. As another example, PE 304A may exchange IP packets with PE 312A on a bidirectional label-switched path (LSP) operating over NNI link 322A, the LSP being an attachment circuit for a VRF configured in PE 304A. Each VRF may include or represent a different routing and forwarding table with distinct routes.

PE routers 302, 304 of IP/MPLS fabric 301 may be configured in respective hub-and-spoke arrangements for services, with PEs 304 implementing service hubs and PEs 302 being configured as spokes of the hubs (for various hub-and-spoke instances/arrangements). A hub-and-spoke arrangement ensures that service traffic is enabled to flow between a hub PE and any of the spoke PEs, but not between different spoke PEs. As described further below, in a hub-and-spoke arrangement for data center-based IP/MPLS fabric 301 and for southbound service traffic (i.e., from a SP to a customer) PEs 302 advertise routes, received from PEs 310, to PEs 304, which advertise the routes to PEs 312. For northbound service traffic (i.e., from a customer to a SP), PEs 304 advertise routes, received from PEs 312, to PEs 302, which advertise the routes to PEs 310.

For some customers of interconnection facility point 303, the interconnection facility point 303 provider may configure a full mesh arrangement whereby a set of PEs 302, 304 each couple to a different customer site network for the customer. In such cases, the IP/MPLS fabric 301 implements a layer 3 VPN (L3VPN) for cage-to-cage or redundancy traffic (also known as east-west or horizontal traffic). The L3VPN may effectuate a closed user group whereby each customer site network can send traffic to one another but cannot send or receive traffic outside of the L3VPN.

PE routers may couple to one another according to a peer model without use of overlay networks. That is, PEs 310 and PEs 312 may not peer directly with one another to exchange routes, but rather indirectly exchange routes via IP/MPLS fabric 301. In the example of FIG. 4B, interconnection facility point 303 is configured to implement multiple layer 3 virtual circuits 330A-330C (collectively, "virtual circuits 330") to interconnect customer network 308 and service provider networks 322 with end-to-end IP paths. Each of service providers 320 and customers 308 may be an endpoint for multiple virtual circuits 330, with multiple virtual circuits 330 traversing one or more attachment circuits between a PE/PE or PE/CE pair for the IP/MPLS fabric 301 and the SP/customer. A virtual circuit 330 represents a layer 3 path through IP/MPLS fabric 301 between an attachment circuit connecting a customer network to the fabric 301 and an attachment circuit connecting a service provider network to the fabric 301. Each virtual circuit 330 may include at least one tunnel (e.g., an LSP and/or Generic Route Encapsulation (GRE) tunnel) having endpoints at PEs 302, 304. PEs 302, 304 may establish a full mesh of tunnels interconnecting one another.

Each virtual circuit 330 may include a different hub-and-spoke network configured in IP/MPLS network 301 having PE routers 302, 304 exchanging routes using a full or partial mesh of border gateway protocol peering sessions, in this example a full mesh of Multiprotocol Interior Border Gateway Protocol (MP-iBGP) peering sessions. MP-iBGP or simply MP-BGP is an example of a protocol by which routers exchange labeled routes to implement MPLS-based VPNs. However, PEs 302, 304 may exchange routes to implement IP-VPNs using other techniques and/or protocols.

In the example of virtual circuit 330A, PE router 312A of service provider network 320A may send a route for service provider network 320A to PE 304A via a routing protocol (e.g., eBGP) peering connection with PE 304A. PE 304A associates the route with a hub-and-spoke network, which may have an associated VRF, that includes spoke PE router 302A. PE 304A then exports the route to PE router 302A; PE router 304A may export the route specifying PE router 304A as the next hop router, along with a label identifying the hub-and-spoke network. PE router 302A sends the route to PE router 310B via a routing protocol connection with PE 310B. PE router 302A may send the route after adding an autonomous system number of the interconnection facility point 303 (e.g., to a BGP autonomous system path (AS_PATH) attribute) and specifying PE router 302A as the next hop router. Interconnection facility point 303 is thus an autonomous system "hop" in the path of the autonomous systems from customers 308 to service providers 320 (and vice-versa), even though the interconnection facility point 303 may be based within a data center. PE router 310B installs the route to a routing database, such as a BGP routing information base (RIB) to provide layer 3 reachability to service provider network 320A. In this way, interconnection facility point 303 "leaks" routes to service provider networks 320 to customer networks 308, without service provider networks 320 to customer networks 308 requiring a direct layer peering connection.

PE routers 310B, 302A, 304A, and 312A may perform a similar operation in the reverse direction to forward routes originated by customer network 308B to PE 312A and thus provide connectivity from service provider network 320A to customer network 308B. In the example of virtual circuit 330B, PE routers 312B, 304A, 302A, and 310B exchange routes for customer network 308B and service provider 320B in a manner similar to that described above for establishing virtual circuit 330B. As a result, interconnection facility point 303 within data center 300 internalizes the peering connections that would otherwise be established between PE 310B and each of PEs 312A, 312B so as to perform aggregation for multiple layer 3 services provided by different service provider networks 320A, 320B and deliver the multiple, aggregated layer 3 services to a customer network 308B having a single NNI link 316B to the interconnection facility point 303. Absent the techniques described herein, fully interconnecting customer networks 308 and service provider networks 320 would require 3×3 peering connections between each of PEs 310 and each of PEs 312. For instance, PE 310A would require a layer 3 peering connection with each of PEs 312. With the techniques described herein, interconnection facility point 303 may fully interconnect customer networks 308 and service provider networks 320 with one peering connection per site PE (i.e., for each of PEs 310 and PEs 312) by internalizing the layer 3 peering and providing data center-based 'transport' between access and aggregate interfaces.

In examples in which IP/MPLS fabric 301 implements BGP/MPLS IP VPNs or other IP VPNs that use route targets to control route distribution within the IP backbone, PEs 304 may be configured to import routes from PEs 302 and to export routes received from PEs 312, using different asymmetric route targets. Likewise, PEs 302 may be configured to import routes from PEs 304 and to export routes received from PEs 310 using the asymmetric route targets. Thus, PEs 302, 304 may configured to implement advanced L3VPNs that each includes a basic backbone L3VPN of IP/MPLS fabric 301 together with extranets of any of customer networks 308 and any of service provider networks 320 attached to the basic backbone L3VPN. Each advanced L3VPN constitutes a service delivery network from a service provider network 320 to one or more customer networks 308, and vice-versa. In this way, interconnection facility point 303 enables any service provider network 320 to exchange service traffic with any customer network 308 while internalizing the layer 3 routing protocol peering connections that would otherwise be established between pairs of customer networks 308 and service provider networks 320 for any service connection between a given pair. In other words, the interconnection facility point 303 allows each of customer networks 308 and service provider networks 320 to establish a single (or more for redundancy or other reasons) layer 3 routing protocol peering connection to the data center-based layer 3 cross-connect. By filtering routes from service provider networks 320 to customer networks 308, and vice-versa, PEs 302, 304 thereby control the establishment of virtual circuits 330 and the flow of associated service traffic between customer networks 308 and service provider networks 320 within a data center 300. Routes distributed into MP-iBGP mesh 318 may be VPN-IPv4 routes and be associated with route distinguishers to distinguish routes from different sites having overlapping address spaces.

As shown in FIG. 4B, data center 300 may include recommendation engine 334. Like FIGS. 2 and 3, recommendation engine 334 may be operably coupled to programmable network platform 120, such that recommendation engine 334 may communicate with programmable network platform 120. In accordance with techniques of the disclosure, recommendation engine 334 may provide scoring data based on prospective interconnection facilities and prospective interconnection facility customers, and output such scoring data to interconnection facility users. Recommendation engine 334 may further provide a particular interconnection facility user with an indication of interconnection opportunities with other interconnection facility users at an interconnection facility where the particular interconnection facility user does not currently have a presence.

In some examples, recommendation engine 334 may obtain a list of prospective interconnection facilities and a list of prospective interconnection facility customers. For example, a service provider may not have a presence in data center 300. As such, data center 300 may be included in the list of prospective interconnection facilities. Further, the service provider may not be connected to customer 308A in any interconnection facility. As such, customer 308A may be included in the list of prospective interconnection facility customers. Recommendation engine 334 may identify sets of interconnection facilities from the plurality of interconnection facilities in which respective interconnection facility customers are configured with existing interconnections based at least in part on querying telemetry data that indicates interconnections of interconnection facility customers within a plurality of interconnection facilities administered by an interconnection facility provider. Recommendation engine 334 may generate scoring data for the prospective interconnection facilities based at least in part on the list of prospective interconnection facilities, the sets of interconnection facilities, and the list of prospective interconnection facility customers. For example, given data center 300's inclusion in the list of prospective interconnection facilities may lead to recommendation engine 334 generating scoring data for data center 300 based on the prospective interconnection facility customers available to the service provider that the service provider does not have an interconnection with in any other facility. Recommendation engine 334 may output the scoring data for display to the service provider.

Figure 5:
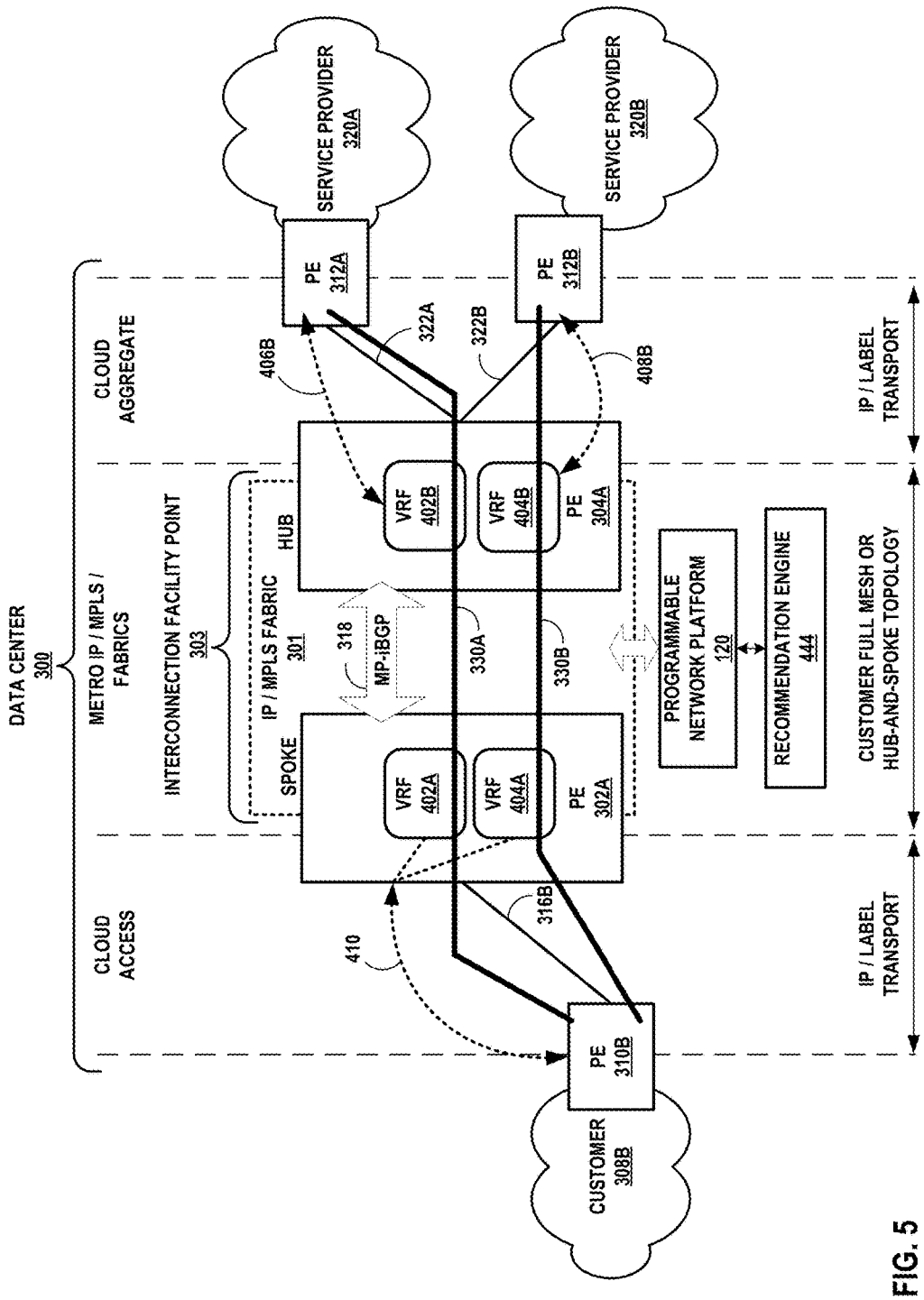
FIG. 5 is a block diagram illustrating an example of a data center-based interconnection facility point in which routers of the interconnection facility point are configured with VPN routing and forwarding instances for routing and forwarding aggregated service traffic from multiple service provider networks to a customer network, according to techniques described herein.

FIG. 5 is a block diagram illustrating an example of a data center-based interconnection facility point in which routers of the interconnection facility point are configured with VPN routing and forwarding instances for routing and forwarding aggregated service traffic from multiple service provider networks to a customer network, according to techniques described herein. In this example, to establish virtual circuits 330A-330B, PE routers 302A and 304A of IP/MPLS fabric 301 are configured with VRFs. PE 302A is configured with VRFs 402A and 404A, while PE 304A is configured with VRFs 402B and 404B. VRF 402A is configured to import routes exported by VRF 402B, and VRF 402B is configured to import routes exported by VRF 402A. The configuration may include asymmetric route targets for import/export between VRFs 402A, 402B. VRF 404A is configured to import routes exported by VRF 402B, and VRF 402B is configured to import routes exported by VRF 402A. The configuration may include asymmetric route targets for import/export between VRFs 402A, 402B.

In this example, PE 304A operates BGP or other route distribution protocol peering connections 406B, 408B with respective PEs 312A, 312B to exchange routes with respective service provider networks 320A, 320B. PE 302A operates a BGP or other route distribution protocol peering connection 410 with PE 310B to exchange routes with customer network 308B. In some examples, as described further below with respect to FIG. 2, PEs 302A, 304A may be statically configured with routes for the site networks.

An administrator for interconnection facility point 303 may configure PEs 302A, 304A with the VRF 402A-402B, 404A-404B in order to leak routes between PEs 312 and PE 310B and facilitate layer 3 connectivity for end-to-end IP paths illustrated here by virtual circuits 330, while potentially optimizing the end-to-end IP paths by fostering data center-based or at least metro-based connectivity. Interconnection facility point 303 may thus provide dedicated service provider access to customer network 308B by way of private and/or public routes for the service provider networks 320. In the northbound direction, interconnection facility point 303 may provide dedicated service provider distribution to multiple customer networks 308 by way of private and/or public routes for the customer networks 308. Neither PE 310B nor any of PEs 302A, 304A need access to the full Internet BGP routing table in order to reach service provider networks 320 or customer networks 308. Moreover, PEs 302A, 304A may be configured to aggregate customer/SP routes and/or service traffic based on any one or more of physical, IP, service, and VRFs.

As shown in FIG. 1, data center 300 may include recommendation engine 444. Like FIGS. 2-4, recommendation engine 444 may be operably coupled to programmable network platform 120, such that recommendation engine 334 may communicate with programmable network platform 120. In accordance with techniques of the disclosure, recommendation engine 334 may provide scoring data based on prospective interconnection facilities and prospective interconnection facility customers, and output such scoring data to interconnection facility users. Recommendation engine 334 may further provide a particular interconnection facility user with an indication of interconnection opportunities with other interconnection facility users at an interconnection facility where the particular interconnection facility user does not currently have a presence. For instance, as further shown in FIGS. 7-8 recommendation engine 334 may output, for display to the particular customer, the scoring data and data indicating the prospective interconnections.

Figure 6:
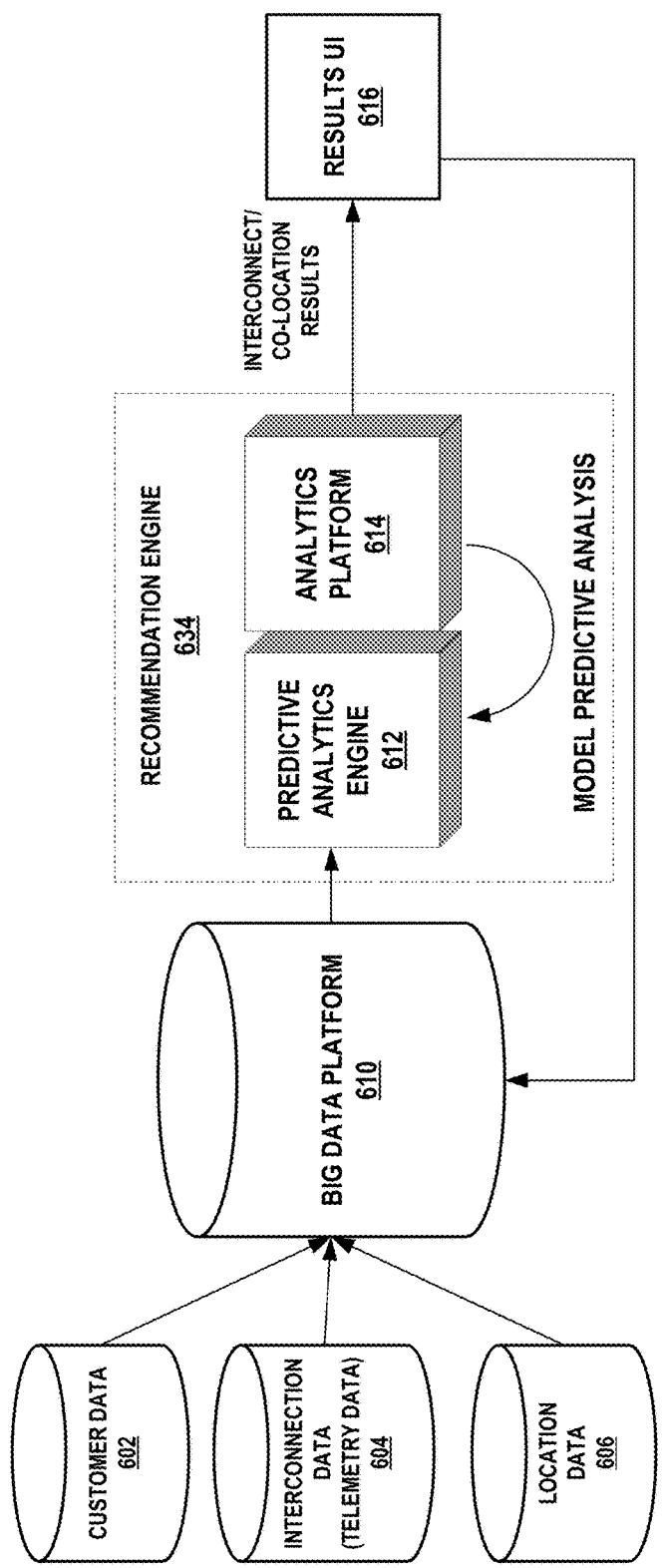
FIG. 6 is a conceptual diagram of logical components that are used to provide scoring data, in accordance with techniques of this disclosure.

FIG. 6 is a conceptual diagram of logical components that are used to provide scoring data, in accordance with techniques of this disclosure. Each of components 602-620 and 634 may be implemented in hardware, software, or a combination of hardware and software. As shown in FIG. 6, recommendation engine 634 may include a predictive analytics engine 612, which generates scoring data in accordance with techniques of this disclosure, and an analytics platform 614, which identifies interconnection and/or co-location opportunities. To provide scoring data, recommendation engine 634 may query big data platform 610 for information, such as but not limited to interconnection facility user information, connection and interconnection information, and interconnection facility information, to name only a few examples. Using this information recommendation engine 634 may generate scoring data for interconnection facility users.

In the example of FIG. 6, big data platform 610 may provide analysis, capture, data curation, search, sharing, storage, transfer, visualization of data received from, but not limited to, customer data 602, interconnection data (or telemetry data) 604, and location data 606. In some examples, each of customer data 602, interconnection data 604, location data 606, and big data platform 610 may be implemented in a Relational Database Management System (RDBMS), Object Database Management System (ODBMS), Online Analytical Processing (OLAP) system, or Big Data Computing system, to name only a few examples. Big data platform may receive data from one or more of customer data 602, interconnection data 604, location data 606 on a periodic, asynchronous, or real-time basis.

Customer data 602 may include information that identifies an interconnection facility user, billing information for the interconnection facility user, location information for the interconnection facility user, co-location/interconnection preference information for the interconnection facility user, to name only a few examples. Interconnection data 604 (or telemetry data) may, as described in FIG. 2, include metrics about the quantity, type, and definition of network and resource configurations that are configured by programmable network platform 120. Interconnection data 604 may include analytics information from infrastructure data collectors based on raw metrics data for resources used in a particular service. In some examples, interconnection data 604 includes connection information that indicates a connection that an interconnection facility user has to an interconnection facility point or interconnection facility. In some examples, interconnection data 604 includes interconnection information that indicates an interconnection between at least two users at an interconnection facility point or interconnection facility. Location data 610 may include information that identifies geographic locations of interconnection facilities, interconnection facility points, interconnection facility user systems, and/or interconnection facility user networks, to name only a few examples.

As shown in FIG. 6, recommendation engine 634 includes predictive analytics engine 612 and analytics platform 614. Predictive analytics engine 612 may predict one or more prospective interconnections for interconnection and/or co-location opportunities based on predicted interconnections that a particular interconnection facility user may establish with one or more other target interconnection facility users, based on one or more criteria, providing scoring data in accordance with one or more techniques of the current disclosure.

In accordance with techniques of this disclosure, predictive analytics engine 612 may obtain a list of prospective interconnection facilities and a list of prospective interconnection facility customers. Predictive analytics engine 612 may generate scoring data for the prospective interconnection facilities based at least in part on the list of prospective interconnection facilities, any requisite characteristics of prospective interconnection facility customers provided to predictive analytics engine 612, and the list of prospective interconnection facility customers. Predictive analytics engine 612 may output the scoring data for display to the particular interconnection facility customer.

In some examples, the scoring data includes scoring data for a plurality of prospective interconnections between a particular interconnection facility customer and a respective prospective interconnection facility customer of the list of prospective interconnection facility customers at a respective prospective interconnection facility of the list of prospective interconnection facilities. In such examples, the scoring data is further based on at least one characteristic of the particular interconnection facility customer and a respective at least one characteristic of the respective prospective interconnection facility customer. In some such examples, the at least one characteristic of the particular interconnection facility customer is based on input received from the particular interconnection facility customer, and the respective at least one characteristic of the respective prospective interconnection facility customer is based on input received from the respective prospective interconnection facility customer. In some examples, the at least one characteristic of the particular interconnection facility customer and the respective at least one characteristic of the respective prospective interconnection facility customer may include characteristics such as at least one interconnection facility location, a business type, a service provided, a service desired, a service price and/or scalability, number of existing customer interconnections with other colocated customers at the prospective interconnection facility, characteristics of other such colocated customers indicating similarities with the particular interconnection facility customer for which the scoring data is being generated, and so forth.

In some examples, predictive analytics engine 612 may rank each prospective interconnection based on the scoring data. This may be represented in the output displayed to the particular interconnection facility customer. As described above, the characteristics may include a business type, a service provided by the particular interconnection facility customer, a service desired by the prospective interconnection facility customer, a service price and/or scalability, number of existing customer interconnections with other colocated customers at the prospective interconnection facility, characteristics of other such colocated customers indicating similarities with the particular interconnection facility customer for which the scoring data is being generated, and so forth. The scoring data may indicate how closely how closely the service provided by the prospective interconnection facility customer matches characteristics provided to predictive analytics engine 612. In other examples, where the scoring data is representative of the prospective interconnection facilities, the scoring data may be representative of the number and/or quality of prospective interconnections at the prospective interconnection facility.

In some examples, the predictive analytics engine 612 may score a prospective interconnection facility customer according to profiles for other interconnection facility customers with which the prospective interconnection facility customer has an existing interconnection as indicated by interconnection data 604. If the other interconnection facility customers have a similar profile to that of the prospective interconnection facility customer, then the predictive analytics engine 612 may score the prospective interconnection facility customer relatively more highly as this profile similarity is indicative of a likelihood of an eventual interconnection with the particular interconnection facility customer. A customer profile for a customer may include pricing information for services, the customer market segment(s), services offered or consumed, revenue, bandwidth consumed, and other customer data indicative of a likelihood of an interconnection with another customer colocated in an interconnection facility with the customer. Customer data 602 may store such customer profiles.

Predictive analytics engine 612 may group the plurality of prospective interconnections based on a location of the respective prospective interconnection facility. As described above, the scoring data may be representative of the number and/or quality of prospective interconnections at the prospective interconnection facility. This example of scoring data may include an aggregate of the scoring data associated with each prospective interconnection at the respective prospective interconnection facility. In such examples, predictive analytics engine 612 may rank the groups of prospective interconnections based on these aggregates for each prospective interconnection facility.

In some examples, predictive analytics engine 612 may generate scoring data based on possible revenues. For example, for each interconnection facility of the list of prospective interconnection facilities, predictive analytics engine may calculate a revenue estimation based on a number of prospective interconnection facility customers associated with the respective interconnection facility, a sales average for the particular interconnection facility customer, and a conversion rate for the particular interconnection facility customer. For instance, a particular interconnection facility customer may have a conversion rate of 30% and a sales average of $1 million. If a prospective interconnection facility has 100 prospective interconnection facility customers for the particular interconnection facility customer, the prospective interconnection facility may have a revenue estimation of $30 million. In some examples, the conversion rate and sales average may be entered by the user.

Analytics platform 614 may request customer information from big data platform 610 for a particular customer to determine interconnection and/or co-location opportunities that are based on prospective interconnections. For example, analytics platform 614 may retrieve a set of interconnection facility user identifiers from big data platform 610 and select an interconnection facility user identifier for the particular interconnection facility user.

For each target interconnection facility user in the set of target interconnection facility users, analytics platform may determine whether a prospective interconnection may be made between the particular interconnection facility user and the respective target interconnection facility user at a different interconnection facility. Accordingly, analytics platform 614 may generate a set of prospective interconnections that may be provided to the particular interconnection facility user. For instance, analytics platform 614 may provide the set of prospective interconnections in a results user interface 616. Details of results user interface 616 for interconnection opportunities are further described in FIGS. 8-9. In some examples, analytics platform 614 may send one or more messages to the particular interconnection facility user, such as an email, text message, or other suitable communication.

Analytics platform 614 may identify a co-location opportunity by determining that the particular interconnection facility user has interconnections with one or more target interconnection facility users in one or more interconnection facilities. Analytics platform 614 may identify one or more interconnection facilities from big data platform 610. For each of the one or more interconnection facilities, analytics platform 614 may determine a count of the one or more target interconnection facility users at the respective interconnection facility. Analytics platform 614 may determine that a prospective interconnection may be established with a target interconnection facility customer if the interconnection facility includes the target interconnection facility user. For each interconnection facility, analytics platform 614 may generate a co-location score representing a count of target interconnection facility users at the interconnection facility, as described in FIGS. 1-2. These counts may be limited by characteristics provided to analytics platform

614. In other words, analytics platform 614 may only include prospective interconnection customers in the count if they match a set of one or more characteristics provided to analytics platform 614.

As with interconnection opportunities, analytics platform 614 may generate a set of prospective co-location opportunities that may be provided to the particular interconnection facility user. For instance, analytics platform 614 may provide the set of co-location opportunities in the results user interface 616. Details of results user interface 616 for co-location opportunities are further described in FIG. 7. In some examples, analytics platform 614 may send one or more messages to the particular interconnection facility user, such as an email, text message, or other suitable communication.

In some examples, the particular interconnection facility user may interact with results user interface 616 to view and select interconnection and/or co-location opportunities for further action. For instance, the particular interconnection facility user may provide a user input that causes a message to be sent from the particular interconnection facility user to a target interconnection facility user. The message may indicate a request to establish an interconnection based on an interconnection opportunity presented by results user interface 616. In another example, the particular interconnection facility user may provide a user input, in response to viewing a co-location opportunity, which causes a programmable network platform to initiate a connection of the particular interconnection facility user with an interconnection facility that the particular interconnection facility user was not previously connected.

Figure 7:
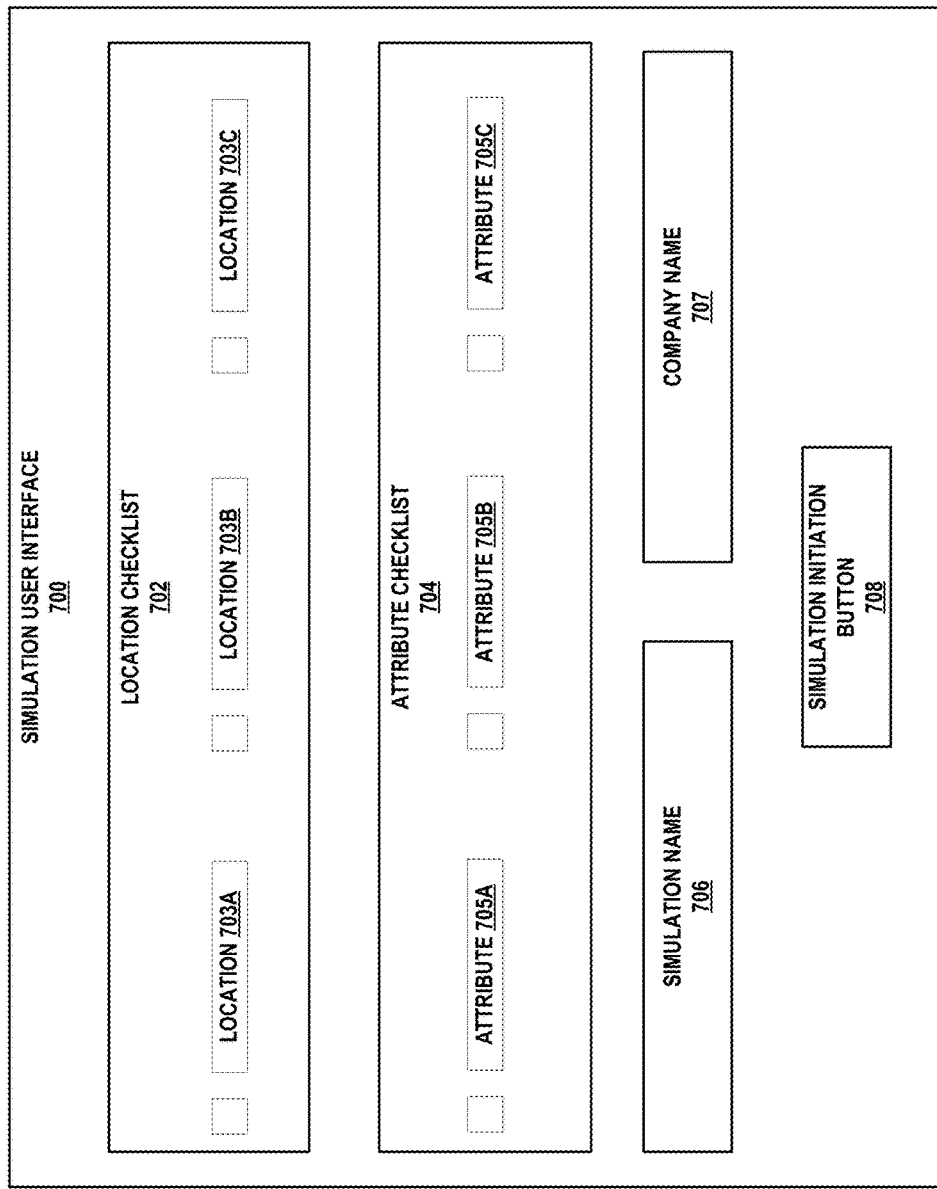
FIG. 7 is an example user interface for initiating a simulation, in accordance with techniques of this disclosure.

FIG. 7 is an example user interface 700 for initiating a simulation, in accordance with techniques of this disclosure. User interface 700 may represent an example instance of results user interface 616 and shows the different criteria that may be used when performing a simulation in accordance with the techniques described herein. For instance, user interface 700 shows location checklist 702 and attribute checklist 704. Location checklist 702 may show one or more possible metros locations 703A-703C that may be checked for the purposes of a simulation. For instance, a prospective interconnection that is included in the results of the simulation may have a presence at the particular metro chosen in location checklist 702. Further, attribute checklist 704 may show one or more possible customer attributes 705A-705C that may be checked for the purposes of a simulation. For instance, attribute checklist 704 may include industry, target market attributes, and/or services provided/consumed (e.g., cloud, IT, network, content & digital media, financial, and enterprise). When a simulation is executed, a computing device may receive indications of user input regarding one or more locations from location checklist 702 and/or one or more attributes of attribute checklist 704. Any prospective interconnection customer that has a location at one of the one or more inputted locations or an attribute matching one of the one or more inputted attributes may be a successful match for the given simulation. Using user interface element 706, a user may save a particular simulation such that the particular combination of metro locations and attributes may be accessed at a later time.

In some examples, recommendation engine 134 may automatically determine the requested metro locations and prospective interconnection customer attributes. For instance, recommendation engine 134 may analyze characteristics about a prospective interconnection customer associated with the user, such as the customer's current locations, the customer's most searched prospective locations, the customer's current market footprint, services offered by the customer, an industry segment or market segment of the customer (e.g., finance, healthcare, telecom, security, network), previous interactions performed by the customer, or any other characteristic of the customer that may give insight into the purpose of the current simulation. The characteristics may be stored to Big Data platform 610 or other suitable data repository. Based on the automatically-determined characteristics of the customer, recommendation engine 134 may determine metro locations and attributes for a simulation. In such instances, recommendation engine 134 may perform a simulation based on the automatically determined attributes and metro locations rather than requiring indications of user input for the simulation. As used herein, a metro location includes one or more interconnection facilities. Accordingly, determining that a customer is co-located at or otherwise is configured with an interconnection at an interconnection facility indicates the customer is co-located at or otherwise configured with an interconnection at the corresponding metro location.

Figure 8:
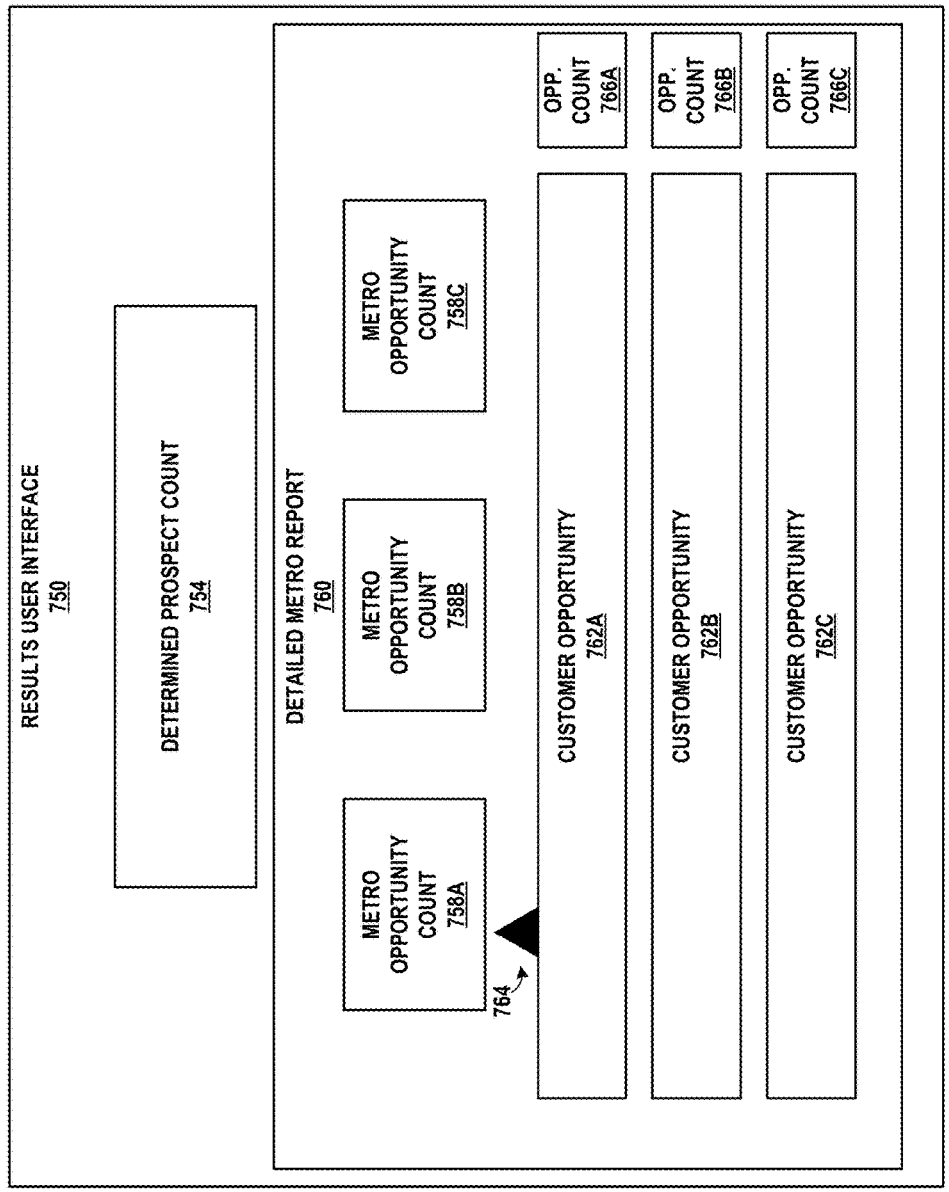
FIG. 8 is an example user interface that indicates scoring data based on one or more prospective interconnections sorted by location, in accordance with techniques of the disclosure.

FIG. 8 is an example user interface 750 that indicates scoring data based on one or more prospective interconnections sorted by location, in accordance with techniques of the disclosure. In some examples, scoring data user interface 750 may be generated by recommendation engine 134 as described in FIG. 2. Scoring data user interface 750 may be generated by recommendation engine 134 for a particular interconnection facility user, such that the information included in scoring data user interface 750 is specific to the particular interconnection facility user. Scoring data user interface 750 may be output for display a computing device of a particular interconnection facility user for which recommendation engine 134 determined co-location opportunities. Scoring data user interface 750 may include one or more user interface elements to output information, such as but not limited to: labels, input fields, drop-down menus, buttons, images, tab controls, and navigation controls to name only a few examples.

Scoring data user interface 750 may also include a location opportunity user interface element 754. User interface element 754 may include a total count of interconnection opportunities that are determined by recommendation engine 134, as described in accordance with techniques of this disclosure.

In some examples, scoring data user interface 750 includes metro opportunity count user interface elements 758A-758C. Although three metro opportunity count user interface elements are illustrated for example purposes, any number of metro opportunity count user interface elements may be include in scoring data user interface 750. Each of user interface elements 758A-758C may correspond to a different geographic location or metro area that includes an interconnection facility, e.g., a metro-based interconnection facility hub. Each of user interface elements 758A-758C may include a location score as determined by recommendation engine 134 in accordance with techniques of the disclosure. For instance, each of user interface elements 758A-758C may include a count of prospective interconnections that may be established by the particular interconnection facility user if the particular interconnection facility user were to locate to the geographic location or metro area associated with the respective user interface element. As an example, user interface element 758A may correspond to the metro of London. User interface element 758A may include a count of a number of prospective interconnections with target interconnection facility users in London, if the particular interconnection facility user were to locate or otherwise establish a connection with an interconnection facility in London.

In other examples, the location score for each of user interface elements 758A-758C may alternatively or additionally include a revenue estimation for the particular metro or city. For example, for each interconnection facility of the list of prospective interconnection facilities depicted by user interface elements 758A-758C, predictive analytics engine may calculate a revenue estimation based on a number of prospective interconnection facility customers associated with the respective interconnection facility, a sales average for the particular interconnection facility customer, and a conversion rate for the particular interconnection facility customer. For instance, a particular interconnection facility customer may have a conversion rate of 75% and a sales average of $4 million. If a prospective interconnection facility has 40 prospective interconnection facility customers for the particular interconnection facility customer, the prospective interconnection facility may have a revenue estimation of $120 million.

In still other examples, the location score for each of user interface elements 758A-758C may be an aggregate of scoring data for each prospective interconnection facility customer located in the respective metro. For instance, the scoring data may include scoring data for a plurality of prospective interconnections between a particular interconnection facility customer and a respective prospective interconnection facility customer of the list of prospective interconnection facility customers at a respective prospective interconnection facility of the list of prospective interconnection facilities. In such examples, the scoring data is further based on at least one characteristic of the particular interconnection facility customer and a respective at least one characteristic of the respective prospective interconnection facility customer. In some such examples, the at least one characteristic of the particular interconnection facility customer is based on input received from the particular interconnection facility customer, and the respective at least one characteristic of the respective prospective interconnection facility customer is based on input received from the respective prospective interconnection facility customer. In some examples, the at least one characteristic of the particular interconnection facility customer and the respective at least one characteristic of the respective prospective interconnection facility customer may include characteristics such as at least one interconnection facility location, a business type, a service provided, a service desired, a service price and/or scalability, number of existing customer interconnections with other colocated customers at the prospective interconnection facility, characteristics of other such colocated customers indicating similarities with the particular interconnection facility customer for which the scoring data is being generated, and so forth. The scoring data may indicate how many prospective interconnection customers are located at a particular interconnection facility, or how valuable or profitable connections with those prospective interconnection customers may be. The location score may then include an aggregate of the scoring data associated with each prospective interconnection at the respective prospective interconnection facility. In such examples, recommendation engine 134 may rank the groups of prospective interconnections based on these aggregates for each prospective interconnection facility.

In still other examples, the locations score may be based on the prospective interconnection facility itself. In such examples, where the scoring data is representative of the prospective interconnection facilities, the scoring data may be representative of the number and/or quality of prospective interconnections at the prospective interconnection facility.

In some examples, scoring data user interface 750 may include a detailed metro report 760 that includes customer opportunity user interface elements 762A-762E. Although three customer opportunity user interface elements are illustrated for example purposes, any number of customer opportunity user interface elements may be include in scoring data user interface 750. Each of customer opportunity user interface elements 762A-762C may identify a specific target interconnection facility user at geographic location or metro area associated with one of user interface elements 758A-758C. As an example, user interface element 762A may include a name, logo, or other identifier of a particular target interconnection facility user. Graphical indicator 764 indicates that user interface elements 762A-762C represent target interconnection facility users associated with a geographic location or metro area that corresponds to user interface element 758A. As such, each target interconnection facility user associated with one of user interface elements 762A-762C has a connection to an interconnection facility in the geographic location or metro area associated with user interface element 758A. Each user interface element 762A-762C may further display an indication of the types of services available from the corresponding target at the selected location. Types of services may include, e.g., financial, network, security, healthcare, and other types of services that may be offered via an interconnection facility as described herein. Scoring data user interface 750 may further include user interface elements 766A-766C, which may display opportunity counts for each customer associated with user interface elements 762A-762C. For instance, the customer associated with user interface element 762A may be located in each of the three searched metro locations. As such, user interface element 766A may display three to represent how many metro locations the customer is located in. Similarly, the customer associated with user interface element 762B may be located in only two of the three searched metro locations. As such, user interface element 766B may display two to represent how many metro locations the customer is located in.

As described above, each customer opportunity 762A-762C may be associated with a particular score. For example, the scoring data may indicate how closely the two interconnection facility customer's business types are related, or how closely the service provided by the particular interconnection facility customer matches the service desired by the prospective interconnection facility customer. In other examples, a more detailed revenue estimation can be calculated for each customer. For instance, a revenue estimation can be estimated based on the amount of gigabytes (GB) transferred per month by the particular customer. The customer associated with customer opportunity 762A may transfer 500,000 GB per month. If the particular interconnection facility customer charges $10 per GB transferred, and the particular interconnection facility customer has a conversion rate of 30%, then the customer associated with customer opportunity 762A may have a revenue estimation of $1.5 million.

Although not shown in FIG. 7, scoring data user interface 750 may include one or more user interface elements that allow a particular interconnection facility user to provide user input, in response to viewing a location opportunity, which causes a programmable network platform to initiate a connection of the particular interconnection facility user with an interconnection facility that the particular interconnection facility user was not previously connected. Scoring data user interface 750 may also include one or more other user interface elements (not shown) to communicate with a programmable network platform and/or one or more other target services users.

In other examples, scoring data user interface 750 may include one or more user interface elements that allow a particular interconnection facility user to provide user input that describe a service to be provided or characteristics about the particular interconnection facility user's business. Based on this input, recommendation engine 134 may generate scoring data more specific to the services to be provided by the particular interconnection facility user. This may further influence ranks of the prospective interconnection facilities, as well as the prospective interconnection facility customers within each prospective interconnection facility.

Figure 9:
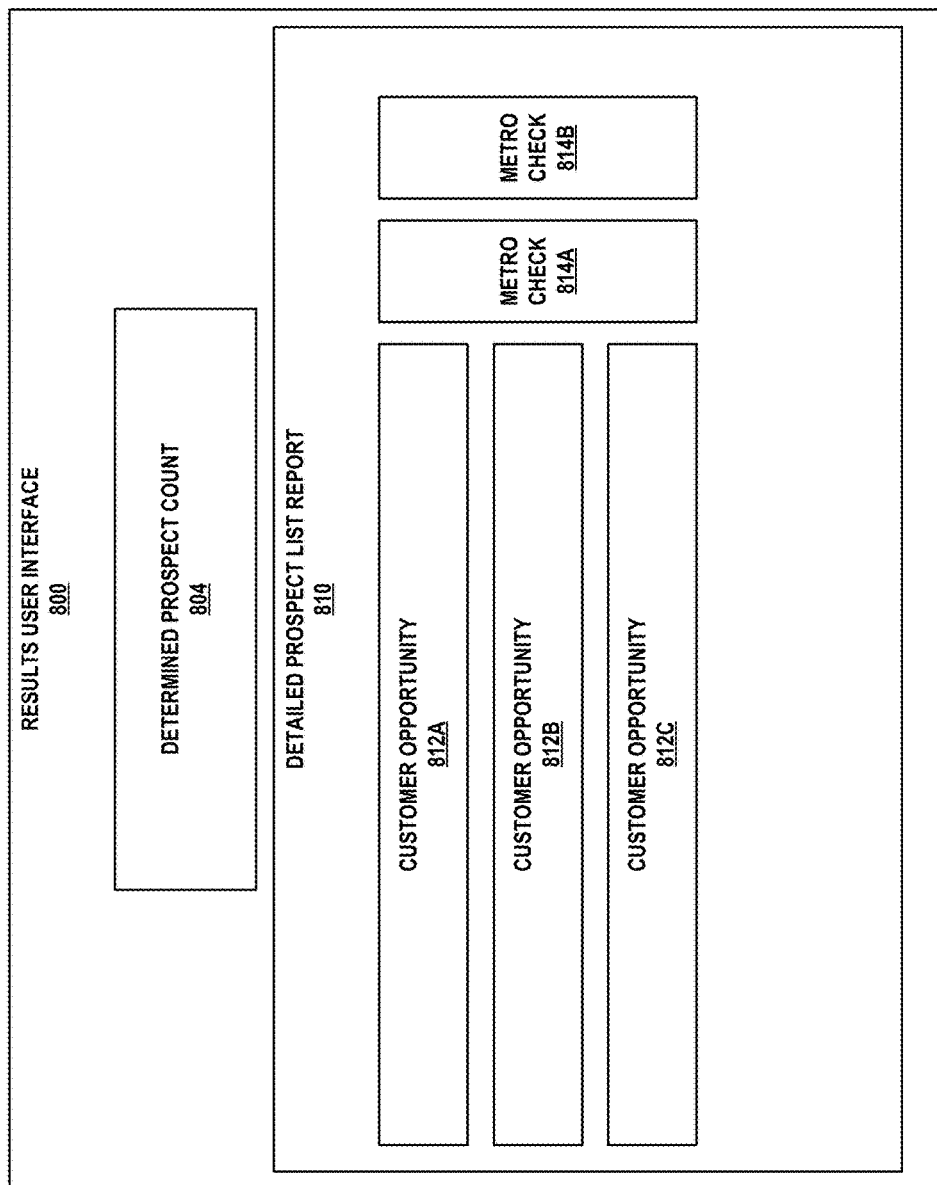
FIG. 9 is an example user interface that indicates scoring data based on one or more prospective interconnections sorted by prospect, in accordance with techniques of the disclosure.

FIG. 9 is an example user interface 800 that indicates scoring data based on one or more prospective interconnections sorted by prospect, in accordance with techniques of the disclosure. A computing device that displays user interface 800 may display an option to view the results of the simulation using either user interface 750 of FIG. 8 or user interface 800 of FIG. 9. Similarly to user interface 750, user interface 800 includes user interface element 804, which may include a total determined prospective interconnection count resulting from the selection criteria provided to recommendation engine 134. User interface 800 may represent an example instance of results user interface 616.

User interface 800 may further include user interface element 810, which includes a detailed prospect list report. User interface element 810 may further include user interface elements 812A-812C, which depict customer opportunities. Although three customer opportunity user interface elements are illustrated for example purposes, any number of customer opportunity user interface elements may be include in scoring data user interface 800. Each of customer opportunity user interface elements 812A-812C may identify a specific target interconnection facility user at a geographic location or metro area included in the simulation criteria. As an example, user interface element 812A may include a name, logo, or other identifier of a particular target interconnection facility user.

As described above, each customer opportunity 812A-812C may be associated with a particular score. For example, the scoring data may indicate how closely the two interconnection facility customer's business types are related, or how closely the service provided by the particular interconnection facility customer matches the service desired by the prospective interconnection facility customer. In other examples, a more detailed revenue estimation can be calculated for each customer. For instance, a revenue estimation can be estimated based on the amount of gigabytes (GB) transferred per month by the particular customer. The customer associated with customer opportunity 812A may transfer 500,000 GB per month. If the particular interconnection facility customer charges $10 per GB transferred, and the particular interconnection facility customer has a conversion rate of 30%, then the customer associated with customer opportunity 812A may have a revenue estimation of $1.5 million.

User interface 800 may further include user interface elements 814A-814B, which depict metro locations used as part of the selection criteria for the simulation. For instance, user interface element 814A may indicate the presence of customers corresponding to user interface elements 812 within the particular metro of London, UK. If the customer associated with customer opportunity 812A has a presence in the particular metro, user interface element 814A may show a graphic aligned with user interface element 812A that indicates the customer's presence at the particular metro. Conversely, if the customer does not have a presence in London, user interface element 814A may show a graphic aligned with user interface element 812A that indicates the customer's non-presence at the particular metro. In some instances, if the user interface element 814A does not show a graphic aligned with user interface element 812A, this indicates the customer's non-presence at the particular metro.

Figure 10:
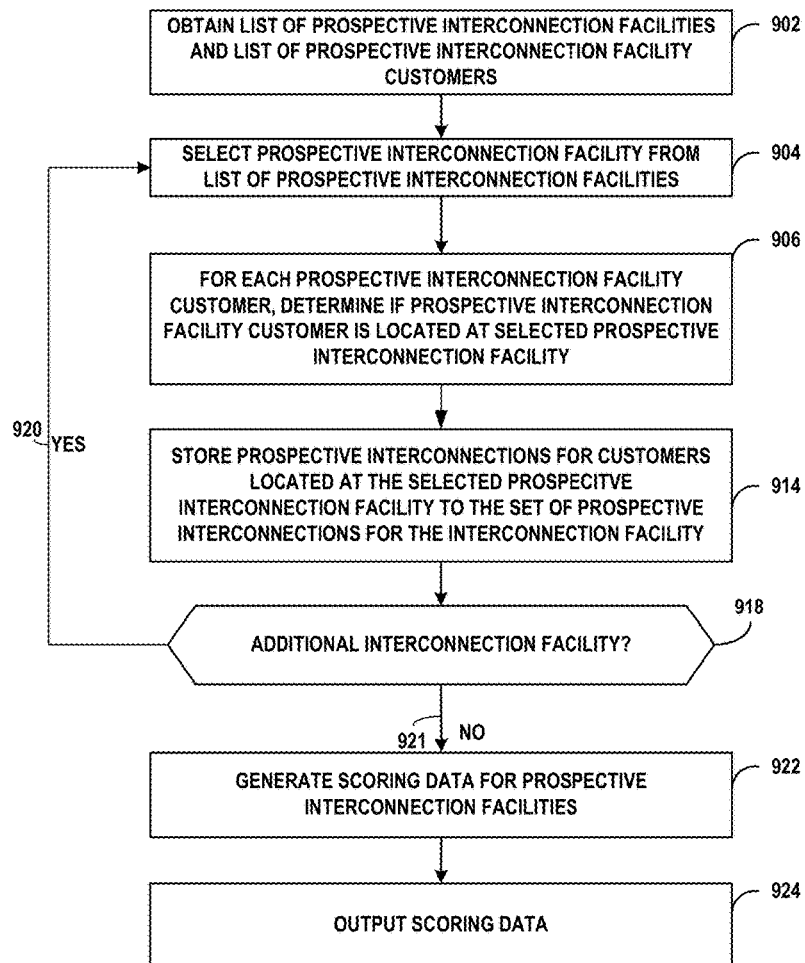
FIG. 10 is a flow diagram illustrating example operations of a computing device that provides scoring data based on one or more prospective interconnections, in accordance with techniques of the disclosure.

FIG. 10 is a flow diagram illustrating example operations of a computing device that provides scoring data based on one or more prospective interconnections, in accordance with techniques of the disclosure. For purposes of illustration only, the example operations are described below within the context of recommendation engine 134, as shown in FIG. 2. Techniques described herein may be performed in response to a request from a user, which may include a customer accessing a customer portal or an employee of the interconnection facility provider. In accordance with techniques of this disclosure, recommendation engine 134 may obtain a list of prospective interconnection facilities and a list of prospective interconnection facility customers (902). For instance, recommendation engine 134 may receive, based on a unique interconnection facility user identifier, the set of target interconnection facility users from customer data or a big data platform that includes the customer data.

To identify an interconnection opportunity based on a prospective interconnection, recommendation engine 134 may select a target interconnection facility from a list of prospective interconnection facilities at which the particular interconnection facility customer is not located (904). For each prospective interconnection facility customer, recommendation engine 134 may determine if the prospective interconnection facility customer is located at the prospective interconnection facility (906). Recommendation engine 134 may store a prospective interconnection in a set of prospective interconnections between the prospective interconnection facility customer and the particular interconnection facility customer if the prospective interconnection facility customer is located at the prospective interconnection facility, as determined in step 906 (914).

Recommendation engine 134 may determine whether additional target interconnection facilities remain that have not been evaluated for interconnection opportunities (918). If additional target interconnection facilities remain that have not been evaluated for interconnection opportunities remain (920), then recommendation engine 134 may select the next target interconnection facility (904). If additional target interconnection facilities do not remain, such that each of the target interconnection facilities have been evaluated for interconnection opportunities (921), then recommendation engine 134 may generate scoring data for the prospective interconnections, including the prospective interconnection facilities (922). Recommendation engine may output the scoring data for display to the particular interconnection facility customer (924). For instance, scoring data and the interconnection opportunities may be included in a graphical user interface that is output for display by a computing device of the particular interconnection facility user.

Recommendation engine 134 may identify sets of interconnection facilities from the plurality of interconnection facilities in which respective interconnection facility customers are configured with existing interconnections based at least in part on querying telemetry data that indicates interconnections of interconnection facility customers within a plurality of interconnection facilities administered by an interconnection facility provider. Recommendation engine 134 may generate scoring data for the prospective interconnection facilities based at least in part on the list of prospective interconnection facilities, the sets of interconnection facilities, and the list of prospective interconnection facility customers. Recommendation engine 134 may output the scoring data for display to the particular interconnection facility customer.

In some examples, the scoring data includes scoring data for a plurality of prospective interconnections between a particular interconnection facility customer and a respective prospective interconnection facility customer of the list of prospective interconnection facility customers at a respective prospective interconnection facility of the list of prospective interconnection facilities. In such examples, the scoring data is further based on at least one characteristic of the particular interconnection facility customer and a respective at least one characteristic of the respective prospective interconnection facility customer. In some such examples, the at least one characteristic of the particular interconnection facility customer is based on input received from the particular interconnection facility customer, and the respective at least one characteristic of the respective prospective interconnection facility customer is based on input received from the respective prospective interconnection facility customer. In some examples, the at least one characteristic of the particular interconnection facility customer and the respective at least one characteristic of the respective prospective interconnection facility customer may include characteristics such as at least one interconnection facility location, a business type, a service provided, a service desired, a service price and/or scalability, number of existing customer interconnections with other colocated customers at the prospective interconnection facility, characteristics of other such colocated customers indicating similarities with the particular interconnection facility customer for which the scoring data is being generated, and so forth.

The interconnections described herein the interconnections are each at least one of a physical cross-connect, a virtual Ethernet connection, a direct layer 3 peering arrangement, and an indirect layer 3 peering arrangement. In some examples, recommendation engine 134 may rank each prospective interconnection based on the scoring data. This may be represented in the output displayed to the particular interconnection facility customer. As described above, the characteristics may include a business type, a service provided by the particular interconnection facility customer, and a service desired by the prospective interconnection facility customer. The scoring data may indicate how closely the two interconnection facility customer's business types are related, or how closely the service provided by the particular interconnection facility customer matches the service desired by the prospective interconnection facility customer. In other examples, where the scoring data is representative of the prospective interconnection facilities, the scoring data may be representative of the number and/or quality of prospective interconnections at the prospective interconnection facility.

Recommendation engine 134 may group the plurality of prospective interconnections based on a location of the respective prospective interconnection facility. As described above, the scoring data may be representative of the number and/or quality of prospective interconnections at the prospective interconnection facility. This example of scoring data may include an aggregate of the scoring data associated with each prospective interconnection at the respective prospective interconnection facility. In such examples, recommendation engine 134 may rank the groups of prospective interconnections based on these aggregates for each prospective interconnection facility.

In some examples, recommendation engine 134 may generate scoring data based on possible revenues. For example, for each interconnection facility of the list of prospective interconnection facilities, predictive analytics engine may calculate a revenue estimation based on a number of prospective interconnection facility customers associated with the respective interconnection facility, a sales average for the particular interconnection facility customer, and a conversion rate for the particular interconnection facility customer. For instance, a particular interconnection facility customer may have a conversion rate of 60% and a sales average of $2 million. If a prospective interconnection facility has 75 prospective interconnection facility customers for the particular interconnection facility customer, the prospective interconnection facility may have a revenue estimation of $90 million.

In some examples, the particular simulation may be saved for future reference. For example, a set of criteria, including potential locations, service characteristics, and potential interconnection facility customers may be used for a future simulation. This set of criteria may be saved in a memory of a computing device such that a user may access the simulation at a later date in order to reevaluate the simulator results.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples of the disclosure have been described. Any combination of the described systems, operations, or functions is contemplated. These and other examples are within the scope of the following claims.

The invention claimed is:

1. A method comprising:
obtaining, by a recommendation engine executing at a computing device, and for a particular interconnection facility customer, a list of prospective interconnection facilities administered by an interconnection facility provider and a list of prospective interconnection facility customers, wherein each interconnection facility provides interconnections between interconnection facility customers serviced at the interconnection facility, wherein the interconnections provided by the interconnection facilities comprise physical connections or virtual connections between resources of the interconnection facility customers;
identifying, by the recommendation engine, based at least in part on querying telemetry data that indicates interconnections of interconnection facility customers within the list of prospective interconnection facilities, sets of interconnection facilities from the list of prospective interconnection facilities in which respective interconnection facility customers are configured with interconnections;
determining, by the recommendation engine and for each of the interconnection facility customers in the list of prospective interconnection facility customers, one or more current interconnections at the respective interconnection facility customer's set of interconnection facilities;
generating, by the recommendation engine, using an analytics platform executing as part of the recommendation engine, and based at least in part on:
(1) the list of prospective interconnection facilities,
(2) the sets of interconnection facilities,
(3) the list of prospective interconnection facility customers,
(4) the one or more current interconnections for each of the interconnection facility customers in the list of prospective interconnection facility customers,
(5) one or more characteristics of the prospective interconnection facility customers, and
(6) one or more characteristics of the particular interconnection facility customer, scoring data, wherein the scoring data comprises scores for each of the prospective interconnection facilities in the list of prospective interconnection facilities and scores for each of the prospective interconnection facility customers in the list of prospective interconnection facility customers; and
outputting, by the recommendation engine and for display to a user, at least a portion of the scoring data, wherein the portion of the scoring data includes at least one score for a prospective interconnection facility in the list of prospective interconnection facilities and at least one score for a prospective interconnection facility customer in the list of prospective interconnection facility customers.

2. The method of claim 1, further comprising:
ranking, by the recommendation engine, each prospective interconnection based on the scoring data.

3. The method of claim 1, further comprising:
grouping, by the recommendation engine, the plurality of prospective interconnections based on a location of the respective prospective interconnection facility.

4. The method of claim 3, further comprising:
ranking, by the recommendation engine, the groups of prospective interconnections based on an aggregate of the scoring data associated with each prospective interconnection at the respective prospective interconnection facility.

5. The method of claim 1, wherein the one or more characteristics of the respective prospective interconnection facility customer is based on input received from the respective prospective interconnection facility customer.

6. The method of claim 1, wherein the one or more characteristics of the respective prospective interconnection facility customer comprise at least one of:
at least one interconnection facility location;
a business type;
a service provided;
a service desired;
a service price and/or scalability;
number of existing customer interconnections with other colocated customers at the prospective interconnection facility;
a profile of the prospective interconnection facility;
a profile of the prospective interconnection facility costumer; and
characteristics of other such colocated customers indicating similarities with the particular interconnection facility customer for which the scoring data is being generated.

7. The method of claim 1, further comprising:
determining, by the recommendation engine, at least one characteristic of the user,
wherein the scoring data is based on the at least one characteristic of the user matching the one or more characteristics of the respective prospective interconnection facility customer.

8. The method of claim 1, further comprising:
for each interconnection facility of the list of prospective interconnection facilities, calculating, by the recommendation engine, a revenue estimation based on a number of prospective interconnection facility customers associated with the respective interconnection facility, a sales average for the particular interconnection facility customer, and a conversion rate for the particular interconnection facility customer.

9. The method of claim 1, wherein the interconnections are each at least one of a physical cross-connect, a virtual Ethernet connection, a direct layer 3 peering arrangement, and an indirect layer 3 peering arrangement.

10. The method of claim 1, wherein obtaining the list of prospective interconnection facilities comprises:
determining, by the recommendation engine based on stored customer data indicating characteristics of a customer associated with the user, the list of prospective interconnection facilities.

11. The method of claim 1,
determining, by the recommendation engine based on stored customer data indicating characteristics of a customer associated with the user, a target service for the user,
wherein the scoring data is further based on the target service being provided by the respective prospective interconnection facility customer.

12. A computing device comprising:
one or more computer processors; and
a memory comprising instructions that when executed by the one or more computer processors cause the one or more computer processors to:
 obtain, for a particular interconnection facility customer, a list of prospective interconnection facilities administered by an interconnection facility provider and a list of prospective interconnection facility customers, wherein each interconnection facility provides interconnections between interconnection facility customers serviced at the interconnection facility, wherein the interconnections provided by the interconnection facilities comprise physical connections or virtual connections between resources of the interconnection facility customers;
 identify, based at least in part on querying telemetry data that indicates interconnections of interconnection facility customers within the list of prospective interconnection facilities, sets of interconnection facilities from the list of prospective interconnection facilities in which respective interconnection facility customers are configured with existing interconnections;
 determine, for each of the interconnection facility customers in the list of prospective interconnection facility customers, one or more current interconnections at the respective interconnection facility customer's set of interconnection facilities;
 generate, using an analytics platform executing as part of the recommendation engine, and based at least in part on:
  (1) the list of prospective interconnection facilities,
  (2) the sets of interconnection facilities,
  (3) the list of prospective interconnection facility customers,
  (4) the one or more current interconnections for each of the interconnection facility customers in the list of prospective interconnection facility customers,
  (5) one or more characteristics of the prospective interconnection facility customers, and
  (6) one or more characteristics of the particular interconnection facility customer, scoring data, wherein the scoring data comprises scores for each of the prospective interconnection facilities in the list of prospective interconnection facilities and scores for each of the prospective interconnection facility customers in the list of prospective interconnection facility customers; and
 output, for display to a user, at least a portion of the scoring data, wherein the portion of the scoring data includes at least one score for a prospective interconnection facility in the list of prospective interconnection facilities and at least one score for a prospective interconnection facility customer in the list of prospective interconnection facility customers.

13. A method comprising:
 obtaining, by a recommendation engine executing at a computing device, and for a particular interconnection facility customer, a set of prospective interconnection facilities administered by an interconnection facility provider and a set of prospective interconnection facility customers, wherein each interconnection facility provides interconnections between interconnection facility customers serviced at the interconnection facility, wherein the interconnections provided by the interconnection facilities comprise physical connections or virtual connections between resources of the interconnection facility customers;
 determining, by the recommendation engine for each interconnection facility from the set of interconnection facilities and based at least in part on querying telemetry data that indicates interconnections configured within the set of prospective interconnection facilities, interconnections configured within the interconnection facility for the set of prospective interconnection facility customers;
 generating, by the recommendation engine, using an analytics platform executing as part of the recommendation engine, for each interconnection facility from the set of interconnection facilities and based on the determined interconnections, one or more characteristics of the prospective interconnection facility customers, and one or more characteristics of the particular interconnection facility customer, scoring data indicating a value of prospective interconnections at each prospective interconnection facility from the set of prospective interconnection facilities and a value of prospective interconnections with each prospective interconnection facility customer from the set of prospective interconnection facility customers; and
 outputting, by the recommendation engine for display to a user, at least a portion of the scoring data, wherein the portion of the scoring data includes at least one score for a prospective interconnection facility in the list of prospective interconnection facilities and at least one score for a prospective interconnection facility customer in the list of prospective interconnection facility customers.

14. The method of claim 13, wherein obtaining the set of prospective interconnection facilities comprises obtaining the set of prospective interconnection facilities from a user.

15. The method of claim 13, wherein obtaining the set of prospective interconnection facility customers comprises obtaining the set of prospective interconnection facility customers from the user.

16. The method of claim 13, wherein obtaining the set of prospective interconnection facility customers comprises obtaining criteria from the user and determining the set of prospective interconnection facility customers based at least on the criteria, wherein the criteria comprises at least one of at least one interconnection facility location, a business type, a service provided, a service desired, a service price and/or scalability, number of existing customer interconnections with other colocated customers at the prospective interconnection facility, and characteristics of other such colocated customers indicating similarities with the particular interconnection facility customer for which the scoring data is being generated.

17. The method of claim 13, wherein the scoring data comprises a number of prospective interconnections with prospective interconnection facility customers from the set of prospective interconnection facility customers available at an interconnection facility from the set of interconnection facilities.

18. The method of claim 13, wherein the scoring data comprises revenue projections for at least one interconnection facility from the set of interconnection facilities.

19. The method of claim 13, further comprising ranking each of the prospective interconnection facilities based at least in part on the scoring data.

20. The method of claim 13, further comprising outputting data indicating prospective interconnections at an interconnection facility from the set of interconnection facilities.

21. The method of claim 20, wherein the data indicating the prospective interconnections identifies respective interconnection facility customers from the set of prospective interconnection facility customers.

22. The method of claim 13, wherein each interconnection from the interconnections comprises one of a physical cross-connect, a virtual Ethernet connection, a direct layer 3 peering arrangement, and an indirect layer 3 peering arrangement.

23. The method of claim 13, wherein each interconnection from the interconnections comprises a virtual circuit.

24. A computing device comprising:
one or more computer processors; and
a memory comprising instructions that when executed by the one or more computer processors cause the one or more computer processors to:
  obtain, for a particular interconnection facility customer, a list of prospective interconnection facilities administered by an interconnection facility provider and a list of prospective interconnection facility customers, wherein each interconnection facility provides interconnections between interconnection facility customers serviced at the interconnection facility, wherein the interconnections provided by the interconnection facilities comprise physical connections or virtual connections between resources of the interconnection facility customers;
  determine, for each interconnection facility from the set of interconnection facilities and based at least in part on querying telemetry data that indicates interconnections configured within the set of prospective interconnection facilities, interconnections configured within the interconnection facility for the set of prospective interconnection facility customers;
  generate, using an analytics platform executing as part of the recommendation engine, for each interconnection facility from the set of interconnection facilities and based on the determined interconnections, one or more characteristics of the prospective interconnection facility customers, and one or more characteristics of the particular interconnection facility customer, scoring data indicating a value of prospective interconnections at each prospective interconnection facility from the set of prospective interconnection facilities and a value of prospective interconnections with each prospective interconnection facility customer from the set of prospective interconnection facility customers; and
  output, for display to a user, at least a portion of the scoring data, wherein the portion of the scoring data includes at least one score for a prospective interconnection facility in the list of prospective interconnection facilities and at least one score for a prospective interconnection facility customer in the list of prospective interconnection facility customers.

* * * * *